United States Patent
Hashimoto

(10) Patent No.: US 10,625,422 B2
(45) Date of Patent: Apr. 21, 2020

(54) ROBOT AND CRANE COOPERATIVE WORK SYSTEM

(71) Applicant: KAWASAKI JUKOGYO KABUSHIKI KAISHA, Kobe-shi, Hyogo (JP)

(72) Inventor: Yasuhiko Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 150 days.

(21) Appl. No.: 15/108,360

(22) PCT Filed: Dec. 24, 2014

(86) PCT No.: PCT/JP2014/006427
§ 371 (c)(1),
(2) Date: Jun. 27, 2016

(87) PCT Pub. No.: WO2015/098100
PCT Pub. Date: Jul. 2, 2015

(65) Prior Publication Data
US 2016/0325433 A1    Nov. 10, 2016

(30) Foreign Application Priority Data
Dec. 27, 2013 (JP) .................. 2013-272656

(51) Int. Cl.
*B25J 9/16* (2006.01)
*B66C 17/06* (2006.01)
*B25J 19/02* (2006.01)

(52) U.S. Cl.
CPC ........... *B25J 9/1679* (2013.01); *B25J 19/023* (2013.01); *B66C 17/06* (2013.01); *G05B 2219/39102* (2013.01); *G05B 2219/45046* (2013.01)

(58) Field of Classification Search
CPC ....... B25J 9/1679; B25J 19/023; B66C 17/06; G05B 2219/39102; G05B 2219/45046
(Continued)

(56) References Cited

U.S. PATENT DOCUMENTS 6,256,553 B1 * 7/2001 Erikkila ................ B66C 13/063
                                                         212/284
7,780,397 B1 * 8/2010 Binford .................. B63B 27/02
                                                         108/52.1

(Continued)

FOREIGN PATENT DOCUMENTS

JP    S62-79982 A    4/1987
JP    H06-218685 A   8/1994
(Continued)

OTHER PUBLICATIONS

Mar. 10, 2015 Search Report issued in International Patent Application No. PCT/JP2014/006427.
(Continued)

*Primary Examiner* — Santosh R Poudel
(74) *Attorney, Agent, or Firm* — Oliff PLC

(57) ABSTRACT

A robot and crane cooperative work system, includes a robot including a hand and an arm which are capable of treating a workpiece or to which a tool is mountable; and a crane which moves the workpiece or the robot, while suspending the workpiece or the robot by the crane, the robot treats the workpiece or the robot in such a manner that the robot operates the hand and the arm to attach the workpiece or the robot to the crane or detach the workpiece or the robot from the crane, the crane moves the workpiece or the robot, and the robot processes the workpiece.

8 Claims, 16 Drawing Sheets

(58) Field of Classification Search
USPC .......................................................... 700/114
See application file for complete search history.

(56) References Cited

U.S. PATENT DOCUMENTS

| | | | | |
|---|---|---|---|---|
| 9,745,025 B1* | 8/2017 | Miller | ..................... | B63B 27/02 |
| 2008/0138532 A1* | 6/2008 | Straccia | ................... | C08J 7/123 |
| | | | | 427/535 |
| 2008/0288125 A1* | 11/2008 | Cameron | ............... | B25J 9/1676 |
| | | | | 700/302 |
| 2009/0084927 A1* | 4/2009 | Nihei | ......................... | B25J 9/08 |
| | | | | 248/674 |
| 2010/0089855 A1* | 4/2010 | Kjolseth | ................. | B66C 13/02 |
| | | | | 212/276 |
| 2010/0126423 A1* | 5/2010 | Van Den Berg | ..... | A01K 5/0266 |
| | | | | 119/57.92 |
| 2010/0307545 A1* | 12/2010 | Osaka | ..................... | B08B 3/024 |
| | | | | 134/198 |
| 2011/0054682 A1* | 3/2011 | Miyauchi | ............... | B25J 9/0084 |
| | | | | 700/245 |
| 2013/0011234 A1* | 1/2013 | Pretlove | ................... | B25J 5/005 |
| | | | | 414/749.1 |
| 2016/0031683 A1* | 2/2016 | Fenker | ................... | B66C 13/40 |
| | | | | 212/276 |

FOREIGN PATENT DOCUMENTS

| | | |
|---|---|---|
| JP | H09-1492 A | 1/1997 |
| JP | H09-202588 A | 8/1997 |
| JP | H10-61192 A | 3/1998 |
| JP | 2013-237525 A | 11/2013 |
| WO | 03/047958 A1 | 6/2003 |

OTHER PUBLICATIONS

Jun. 28, 2016 International Preliminary Report on Patentability issued in International Patent Application No. PCT/JP2014/006427.
Mar. 22, 2016 Search Report issued in Taiwanese Patent Application No. 103145372.

* cited by examiner

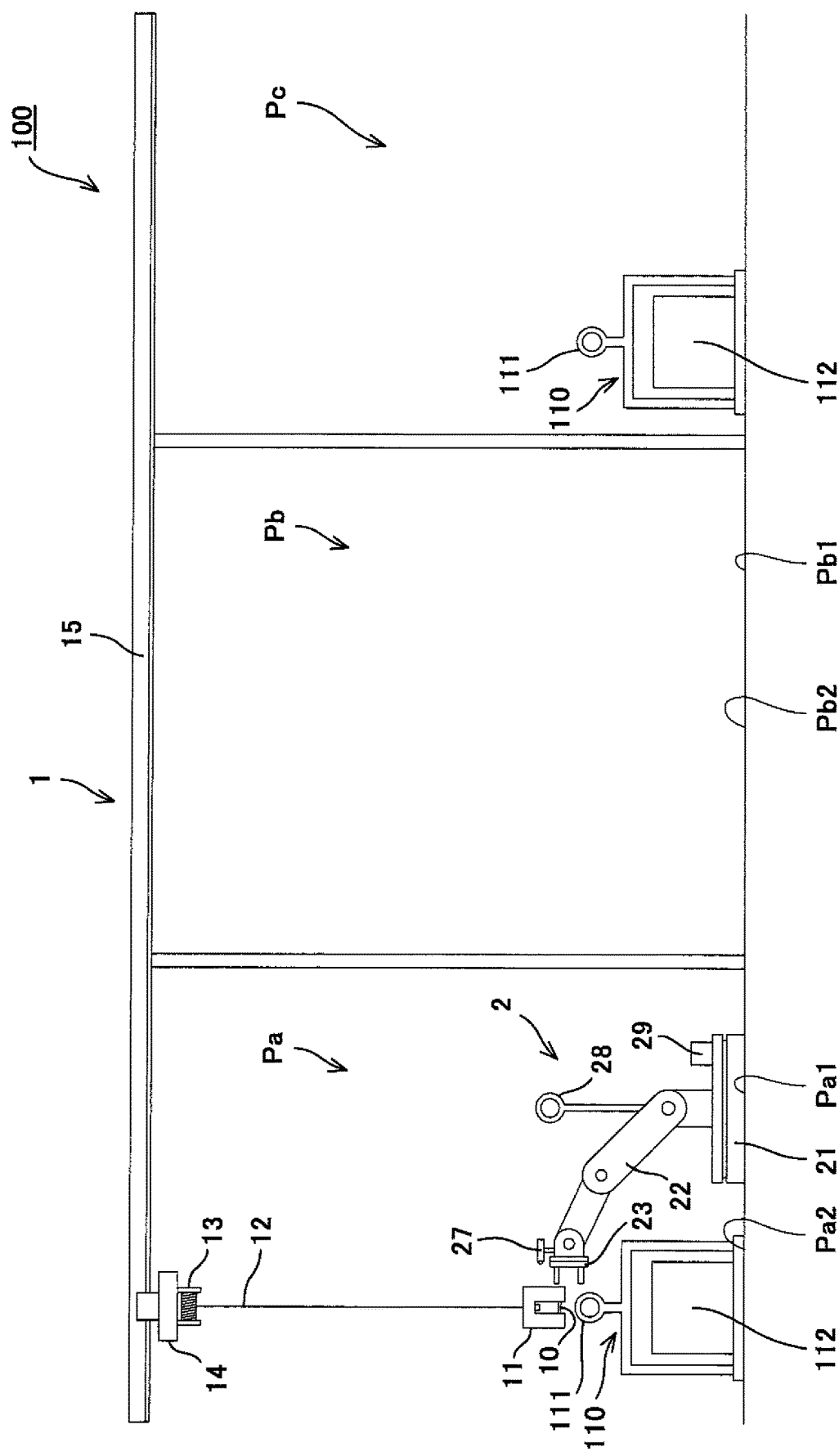

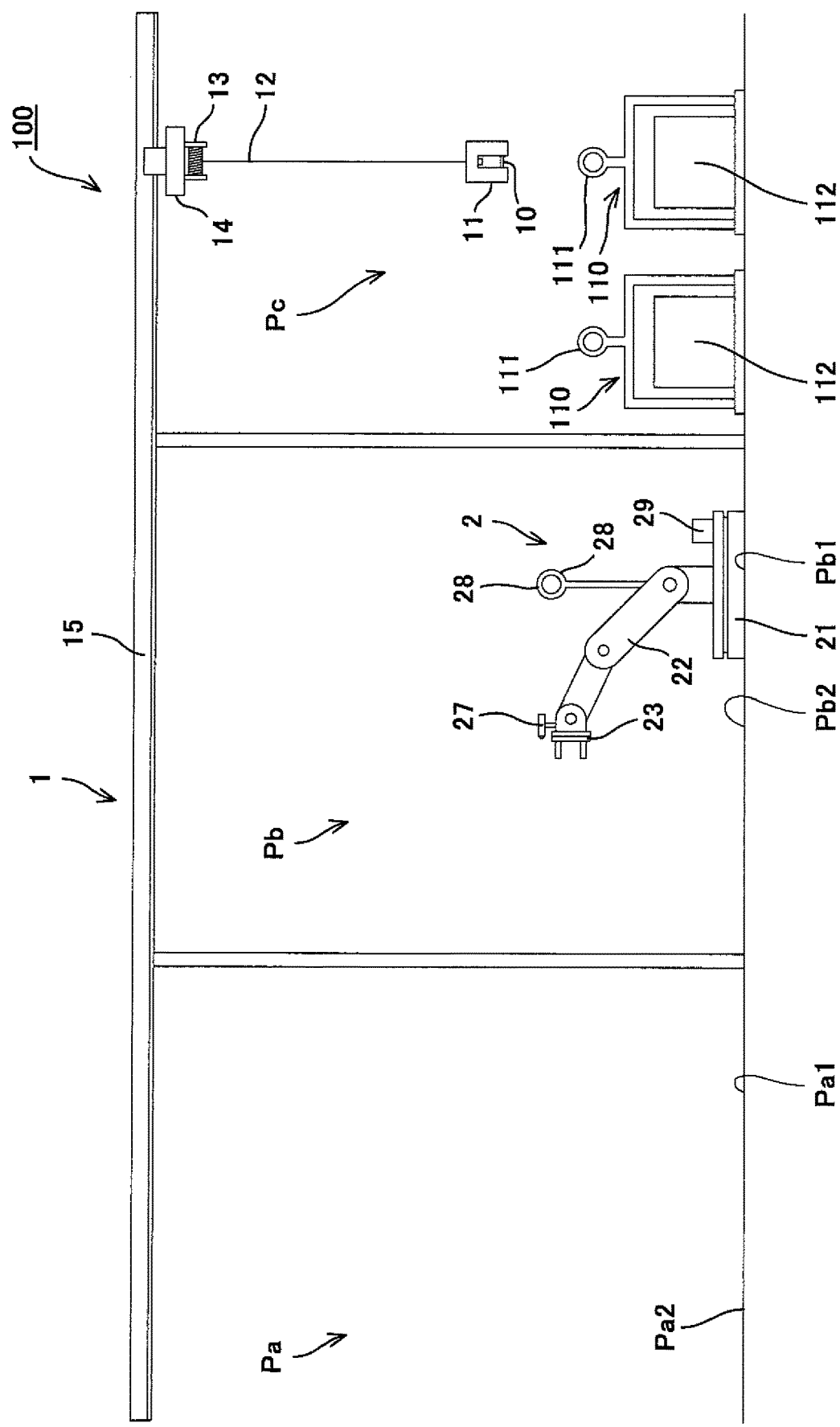

ROBOT AND CRANE COOPERATIVE WORK SYSTEM

TECHNICAL FIELD

The present invention relates to a robot and crane cooperative work system, in which a robot and a crane work (operate) cooperatively.

BACKGROUND ART

Conventionally, there is known a system in which a workpiece is transferred (carried) by use of a robot to reduce the number of operators who work in factories (see e.g., Patent Literature 1).

This system which transfers the workpiece includes the robot including a holding section, and a balancer including a holding section for holding the workpiece, and a seat. The holding section of the robot holds the seat of the balancer on which the workpiece is held by the holding section of the balancer, and the robot moves the holding section thereof to a transfer position according to a transfer track. In this way, the workpiece can be located at the transfer position.

CITATION LIST

Patent Literature

Patent Literature 1: Japanese Laid-Open Patent Application Publication No. Hei. 9-1492

SUMMARY OF INVENTION

Technical Problem

However, the system which transfers the workpiece, disclosed in Patent Literature 1, has a problem that the workpiece cannot be transferred to a spot which is outside the operation region of the robot.

Since the workpiece is transferred to the spot which is outside the operation region of the robot by a production line, an automatic conveyor transfer device may convey the workpiece. However, in this case, a great floor area is required to install a conveyor, which increases the floor area occupied by the system.

In addition, the robot does not instruct a crane (e.g., overhead crane) to transfer (carry) the workpiece. Also, the crane does not transfer the robot which works.

The present invention has been made to solve the above-described problem, and an object of the present invention is to provide a robot and crane cooperative work system which can, by use of the robot, transfer and process a workpiece as in a case where an operator works in a conventional method, and prevent an increase in a floor area required to transfer the workpiece Another object of the present invention is to reduce the number of operators who work in a production line and perform operations in the production line without an operator, without providing special equipment or device for automation, such as an automatic conveyor transfer device

Solution to Problem

To achieve the above-described object, according to an aspect of the present invention, a robot and crane cooperative work system, comprises: a robot including a hand and an arm which are capable of treating a workpiece or to which a tool is mountable; and a crane which moves an object which is the workpiece or the robot, while suspending the object by the crane, wherein the robot treats the object in such a manner that the robot operates the hand and the arm to attach the object to the crane or detach the object from the crane, the crane moves the object, and the robot processes the workpiece.

In accordance with this configuration, the robot can treat the object in such a manner that the robot operates the hand and the arm to attach the object to the crane or detach the object from the crane, the crane can move the workpiece to a predetermined place which is outside the operation region of the robot, and the robot can process the workpiece. Therefore, by use of the robot, the workpiece can be transferred and processed as in a case where an operator works in a conventional method. That is, the robot performs the whole of the operator's work in the production line. Therefore, without providing special equipment or device for automation, such as an automatic conveyor transfer device, the number of operators working in the production line can be reduced, or the operations in the production line can be carried out without an operator, with a simple configuration.

Since the robot and the crane are transferred by the crane, it becomes possible to prevent an increase in a floor area required to transfer the workpiece.

The robot and crane cooperative work system may further comprise a system control section, wherein the crane and the robot may be configured to allow the system control section to instruct the crane and the robot to perform operations, and the system control section may instruct the crane and the robot to perform the operations.

In accordance with this configuration, the robot works as in a case where the operator works in the conventional method. Therefore, the operations in the production line can be performed without the operator.

The crane and the robot may be configured to allow the robot to instruct the crane to perform an operation, and the robot may instruct the crane to perform the operation.

In accordance with this configuration, the robot works as in a case where the operator works in the conventional method. Therefore, the operations in the production line can be performed without the operator.

The crane and the robot may be configured to allow the crane to instruct the robot to perform an operation, and the crane may instruct the robot to perform the operation.

In accordance with this configuration, the robot works as in a case where the operator works in the conventional method. Therefore, the operations in the production line can be performed without the operator.

The robot may be configured to treat the object in such a manner that the robot operates the hand and the arm to attach the object to the crane.

In accordance with this configuration, even in a case where the position accuracy of the workpiece or the robot which is located at a predetermined position is low, the robot can attach the workpiece or the robot itself to the crane. In addition, a configuration for attaching the workpiece or the robot to the crane can be simplified.

The robot may be configured to treat the object in such a manner that the robot operates the hand and the arm to detach the object suspended by the crane from the crane.

In accordance with this configuration, even in a case where the transfer position accuracy of the workpiece or the robot which is transferred by the crane is low, the robot can detach the workpiece or the robot itself from the crane.

The object may be the robot.

In accordance with this configuration, the robot attaches the robot itself to the crane or detach the robot itself from the crane. Therefore, the robot can move to the processing place of the workpiece for itself.

The object may be the workpiece.

In accordance with this configuration, since the robot attaches the workpiece to the crane, the workpiece can be attached to the crane without the operator, even when the position accuracy of the workpiece located at the predetermined position is low. Or, since the robot detaches the workpiece from the crane, the workpiece can be detached from the crane without the operator, even when the accuracy of the position to which the workpiece is transferred by the crane is low.

The object may include an engagement section, and the crane includes a suspending unit which is engageable with the engagement section of the object, and the robot may cause the hand to hold the suspending unit, and attach the held suspending unit to the engagement section of the object or detach the held object from the engagement section of the object.

In accordance with this configuration, the robot can suitably attach the workpiece or the robot to the crane.

The crane may include: a movement mechanism which moves up and down the suspending unit and moves the suspending unit horizontally; and a crane control section which controls an operation of the movement mechanism, the robot may include: a robot base section placed on a placement surface; the atm having a base end portion coupled to the robot base section; the hand mounted to a tip end portion of the arm; a robot control section which controls an operation of the arm and an operation of the hand; an object engagement section position obtaining section which obtains a position of the engagement section of the object; and a suspending unit position obtaining section which obtains a position of the suspending unit of the crane, the robot control section may cause the hand to hold the suspending unit based on the position of the suspending unit which is obtained by the suspending unit position obtaining section, and move the hand to guide the suspending unit to a first guide position set based on the position of the engagement section which is obtained by the object engagement section position obtaining section.

In accordance with this configuration, the robot can more suitably attach the workpiece or the robot to the crane.

The robot may further include a camera mounted to the hand or the arm, and the object engagement section position obtaining section may be configured to process an image taken by the camera to obtain the position of the engagement section, and the suspending unit position obtaining section is configured to process the image taken by the camera to obtain the position of the suspending unit.

In accordance with this configuration, the robot can obtain, for itself, the position of the engagement section of the object and the position of the suspending unit of the crane.

Advantageous Effects of Invention

The present invention can obtain an advantage that it is possible to provide a robot and crane cooperative work system which can transfer and process a workpiece by use of a robot, as in a case where an operator works in a conventional method, and prevent an increase in a floor area required to transfer the workpiece.

BRIEF DESCRIPTION OF DRAWINGS

FIG. 6B is a view showing the exemplary operation of the robot and crane cooperative work system of FIG. 1.

FIG. 6E is a view showing the exemplary operation of the robot and crane cooperative work system of FIG. 1.

DESCRIPTION OF EMBODIMENTS

Hereinafter, the embodiments of the present invention will be described with reference to the drawings. It should be noted that the present invention is not limited by the embodiments. Throughout the drawings, the same or corresponding components are designated by the same reference symbols and will not be described repeatedly.

Embodiment 1

Figure 1:
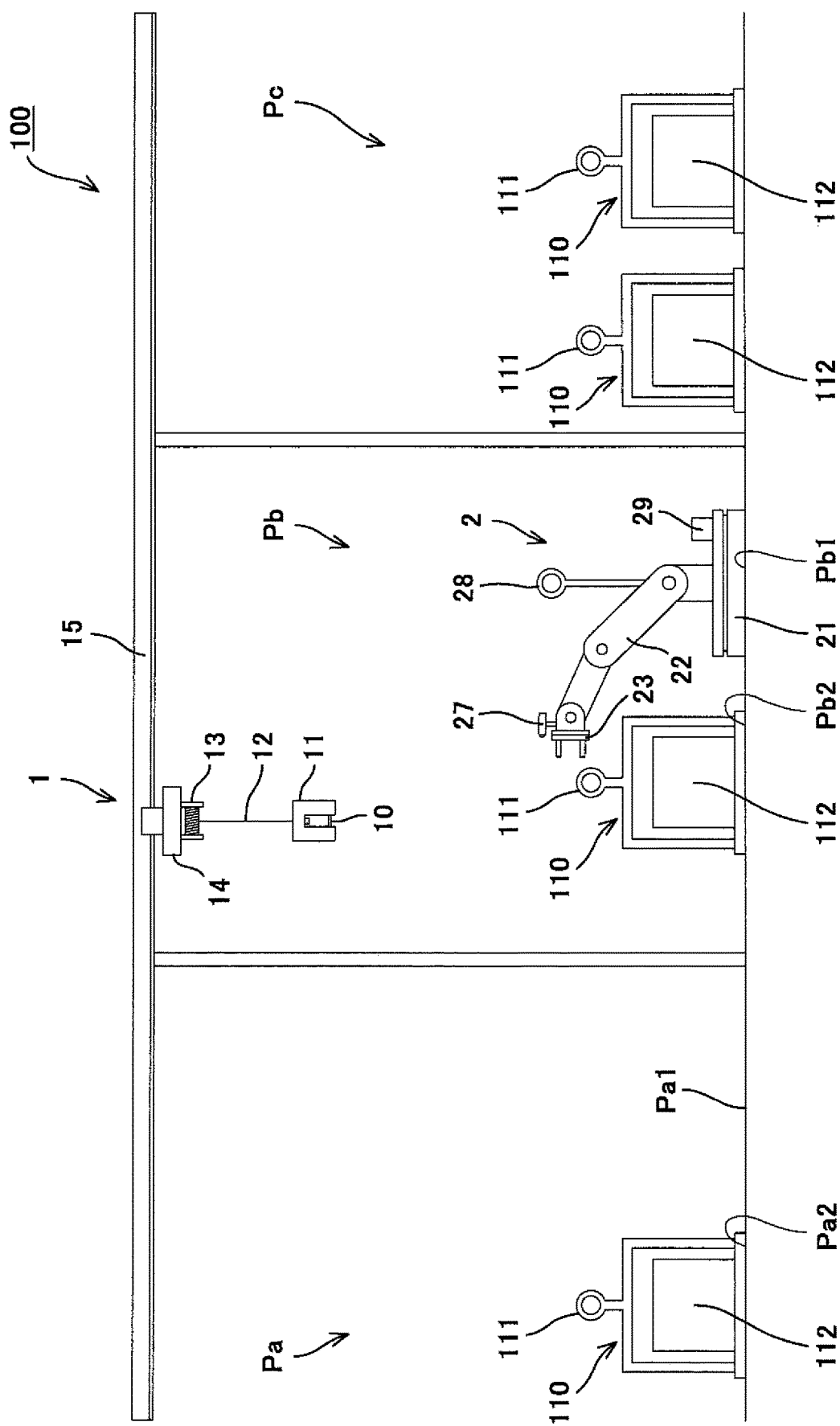
FIG. 1 is a view showing the exemplary configuration of a robot and crane cooperative work system according to Embodiment 1 of the present invention.

FIG. 1 is a view showing the exemplary configuration of a robot and crane cooperative work system 100 according to Embodiment 1 of the present invention, in which a robot and a crane work (operate) cooperatively As shown in FIG. 1, the cooperative work system 100 is installed on, for example, a work place where a workpiece 110 is to be processed, such as a production line, and includes a crane 1 and a robot 2. It should be noted that the place where the cooperative work system 100 is installed is not limited to the production line.

In this production line, an unprocessed workpiece placement place Pa, a processing place Pb, and a processed workpiece placement place Pc which are set (disposed) in places which are distant from each other.

The unprocessed workpiece placement place Pa is a place where the workpiece 110 which is unprocessed (is not processed yet) is placed. In the unprocessed workpiece placement place Pa, a robot placement position Pa1 which is a location at which the robot is placed, and a workpiece placement position Pa2 which is a location at which the workpiece is placed are set. The workpiece 110 located at the workpiece placement position Pa2 is set to be located within the operation region (which will be described later) of the robot 2 located at the robot placement position Pa1.

The processing place Pb is a place where the robot 2 processes the workpiece 110. In the processing place Pb, a robot placement position Pb1 which is a location at which the robot is placed, and a workpiece processing position Pb2 at which the workpiece is processed are set. The workpiece 110 located at the workpiece processing position Pb2 is set to be located within the operation region (which will be described later) of the robot 2 placed at the robot placement position Pb1.

The processed workpiece placement place Pc is a place where the workpiece 110 having been processed by the robot 2 is placed.

The workpiece 110 includes a workpiece body 112 and an engagement section 111 which is engageable with an engagement section 10 of a suspending unit 11 of the crane 1 which will be described later. The engagement section 111 is provided immediately above, for example, the center of gravity of the workpiece 110, and bears a load of the workpiece 110 suspended by the crane 1.

[Crane]

The crane 1 is, for example, an overhead crane provided in the vicinity of a ceiling of a building in which the production line is installed. However, the configuration of the crane 1 is not limited to the overhead crane and may be arbitrary.

Figure 2:
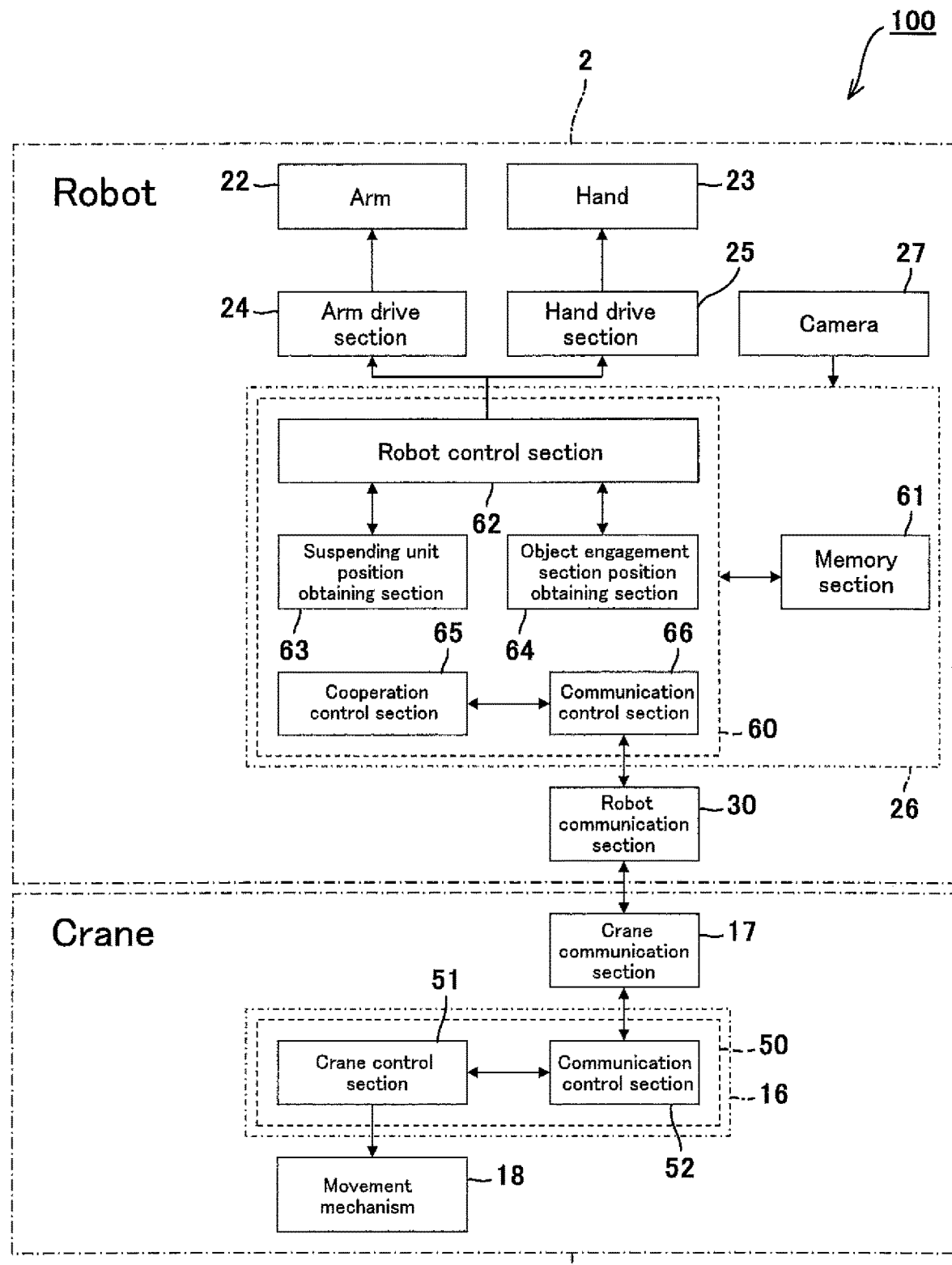
FIG. 2 is a block diagram schematically showing the exemplary configuration of a control system of the robot and crane cooperative work system of FIG. 1.

The crane 1 includes the suspending unit 11, a wire rope 12, a winch 13, a trolley 14, a traveling rail 15, a control unit 16 (see FIG. 2), and a crane communication section 17 (see FIG. 2).

The suspending unit 11 includes the engagement section 10 which is engageable with the engagement section 111 of the workpiece 110 and an engagement section 28 of the robot 2 which will be described later. The suspending unit 11 can be held by a hand 23 of the robot 23 which will be described later.

In the present embodiment, the suspending unit 11 includes an automatic hook mechanism, which allows the suspending unit 11 to be automatically detached from the engagement section 111 of the workpiece 110 and the engagement section 28 of the robot 2. This automatic hook mechanism is configured to cause the suspending unit 11 to be disengaged from the engagement section 111 of the workpiece 110 and the engagement section 28 of the robot 2, when a load applied to the wire rope 12 becomes zero, for example. A well-known automatic hook mechanism can be used as the automatic hook mechanism, and therefore, further description of the automatic hook mechanism will not be given.

The engagement section 10 is, for example, a lever formed inside a groove extending upward from the lower end of the suspending unit 11. The engagement section 10 is moved down from a position that is above the engagement section 111 of the workpiece 110 or the engagement section 28 of the robot 2 which will be described later, and the engagement section 111 of the workpiece 110 or the engagement section 28 of the robot 2 which will be described later, is inserted into the groove of the suspending unit 11. Thereby, the engagement section 10 is moved into the groove of the suspending unit 11, and the engagement section 111 or the engagement section 28 is retained within the groove of the suspending unit 11. In this way, the engagement section 10 of the crane 1 and the engagement section 111 of the workpiece 110 can be engaged with each other. Or, the engagement section 10 of the crane 1 and the engagement section 28 of the robot 2 can be engaged with each other.

The lower end of the wire rope 12 is attached to the suspending unit 11. The wire rope 12 extends upward from the suspending unit 11. The upper end portion of the wire rope 12 is reeled-off by the winch 13.

The winch 13 reels-off and reels-out the wire rope 12 around a drum (not shown) to move up and down the suspending unit 11. The winch 13 includes a drive section (not shown) which rotates the drum.

The winch 13 is mounted to the trolley 14. The trolley 14 is a car which moves the winch 13. The trolley 14 is driven to travel by a drive section provided at the trolley 14. The trolley 14 horizontally moves the suspending unit 11.

As described above, the drive section of the winch 13 and the drive section of the trolley 14 are provided at the winch 13 and the trolley 14, respectively. Alternatively, for example, the drive section of the winch 13 and the drive section of the trolley 14 may be externally provided with respect to the winch 13 and the trolley 14. The winch 13 and the trolley 14 constitute a movement mechanism 18 (see FIG. 2).

The traveling rail 15 is a rail which supports and guides the trolley 14. The traveling rail 15 extends through a region that is above the robot placement position Pa1 and the workpiece placement position Pa2 of the unprocessed workpiece placement place Pa, the robot placement position Pb1 and the workpiece processing position Pb2 of the processing place Pb, and the processed workpiece placement place Pc.

FIG. 2 is a block diagram schematically showing the exemplary configuration of a control system of the cooperative work system 100.

As shown in FIG. 2, the control unit 16 of the crane 1 includes a control section 50 and is configured to include, for example, a microcontroller, a CPU, a MPU, a logic circuit, a PLC (programmable logic controller), etc. The control unit may be configured as a single control unit which performs a control in a centralized manner, or as a plurality of control units which perform a control in a distributed manner.

The control section 50 includes a crane control section 51 and a communication control section 52. The crane control section 51 and the communication control section 52 are functional blocks realized by control programs executed by a processor.

The crane control section 51 controls the movement mechanism 18, namely, the drive section of the winch 13 and the drive section of the trolley 14, to move the suspending unit 11. The communication control section 52 controls the crane communication section 17.

The crane communication section 17 performs, for example, a wireless communication with the robot communication section 30, under control of the communication control section 52.

[Robot]

As shown in FIGS. 1 and 2, the robot 2 is, for example, a multi-joint type industrial robot. The robot 2 includes a robot base section 21, an arm 22, the hand 23, an arm drive section 24 (see FIG. 2), a hand drive section 25 (see FIG. 2), a control unit 26 (see FIG. 2), a camera 27, the engagement section 28, and a robot communication section 30 (see FIG. 2).

The robot base section 21 is a board placed on a placement surface such as a floor surface of the production line, in a state in which the robot base section 21 is not fixed to the placement surface. The robot base section 21 supports the arm 22 and the hand 23.

The arm 22 includes, for example, a plurality of joints, and the base end portion of the arm 22 is coupled to the robot base section 21 in such a manner that the arm 22 is rotatable.

The hand 23 is configured to perform a holding operation for holding an object and a releasing operation for releasing the object from the hand 23. The hand 23 is attached to the tip end portion of the hand 23. In addition, the hand 23 is configured to perform a mounting operation for mounting a tool used in a work performed in the processing place Pb and a detaching operation for detaching the mounted tool.

The arm drive section 24 drives the arm 22 to locate the hand 23 at a predetermined position within the operation region of the robot 2.

The hand drive section 25 drives the hand 23 to cause the hand 23 to perform the holding operation, the releasing operation, the mounting operation, and the detaching operation.

The camera 27 is, for example, a stereo video camera which is able to take a three-dimensional motion image. By processing the image taken by the camera 27, a distance between a target object and a position of the target object being in this image, on a picture plane (vision), can be obtained. The camera 27 is attached to the hand 23. Therefore, by moving the arm 22, the camera 27 can take an image in a desired direction. The location at which the camera 27 is attached is not limited to the hand 23.

In the present embodiment, the robot 2 is a power supply built-in robot, which contains a battery 29 for supplying electric power used to drive the arm 22 and the hand 23. This makes it possible to drive the robot 2 without connecting the robot 2 to an external power supply via a power supply cable. Alternatively, the robot 2 may be supplied with electric power in a wireless manner.

The engagement section 28 is configured to be engageable with, for example, the engagement section 10 of the suspending unit 11 of the crane 1. The engagement section 28 is located immediately above, for example, the center of gravity of the robot 2, and bears the load of the robot 2 suspended by the crane 1.

As shown in FIG. 2, the control unit 26 of the robot includes a control section 60 and a memory section 61 and is configured to include, for example, a microcontroller, a CPU, a MPU, a logic circuit, a PLC, etc. This control unit may be configured as a single control unit which performs a control in a centralized manner, or as a plurality of control units which perform a control in a distributed manner.

The memory section 61 includes memories such as a ROM and a RAM. Information used to identify the position of the engagement section 28 of the robot 2 is stored in the memory section 61.

The control section 60 includes a robot control section 62, a suspending unit position obtaining section 63, an object engagement section position obtaining section 64, a cooperation control section 65, and a communication control section 66.

The robot control section 62, the suspending unit position obtaining section 63, the object engagement section position obtaining section 64, the cooperation control section 65, and the communication control section 66, are functional blocks realized by execution of specified control programs stored in the memory section 61, by a processor.

The robot control section 62 controls the arm drive section 24 to operate the arm 22, and controls the hand drive section 25 to operate the hand 23. In addition, the robot control section 62 controls the operation of the tool mounted to the hand 23.

The suspending unit position obtaining section 63 processes the image taken by the camera 27 to obtain the position of the suspending unit 11 of the crane 1. Thus, the robot 2 is able to obtain the position of the suspending unit 11 of the crane 1 for itself.

The object engagement section position obtaining section 64 obtains the position of the engagement section 28 of the robot 2, and the position of the engagement section 111 of the workpiece 110. The position of the engagement section 28 of the robot 2 is obtained in such a manner that the object engagement section position obtaining section 64 reads-in the position information of the engagement section 28 of the robot 2 which is stored in the memory section 61. The position of the engagement section 111 of the workpiece 110 is obtained in such a manner that the object engagement section position obtaining section 64 processes the image taken by the camera 27. In this way, the robot 2 can obtain, for itself, the position of the engagement section 28 of the robot 2 or the position of the engagement section 111 of the workpiece 110.

The cooperation control section 65 instructs the crane control section 51 to operate the crane, via the communication control section 66, the robot communication section 30, the crane communication section 17, and the communication control section 52.

The communication control section 66 controls the robot communication section 30.

The robot communication section 30 performs, for example, a wireless communication with the crane communication section 17, under control of the communication control section 66.

It should be noted that a communication means between the crane 1 and the robot 2 is not limited to a wireless communication means.

[Exemplary Operation]

Next, the exemplary operation of the cooperative work system 100 will be described. This operation is carried out by the control unit 26 of the robot 2 and the control unit 16 of the crane 1.

Figure 3:
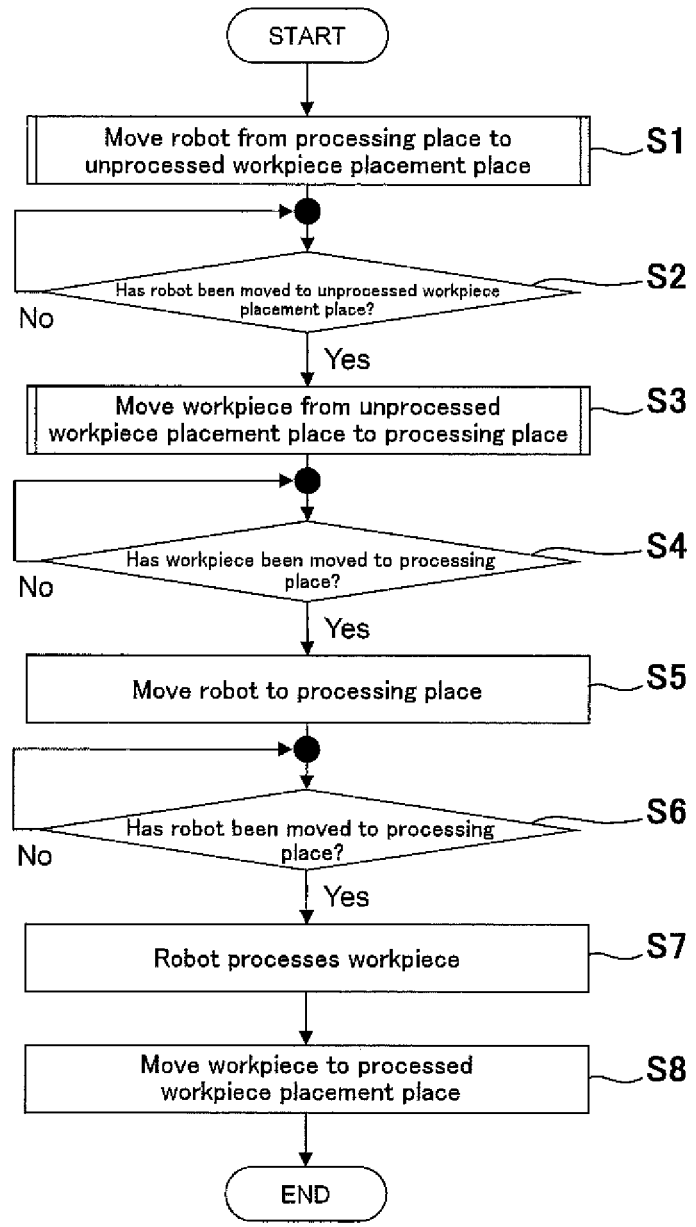
FIG. 3 is a flowchart showing the exemplary operation of the robot and crane cooperative work system of FIG. 1.
Figure 4:
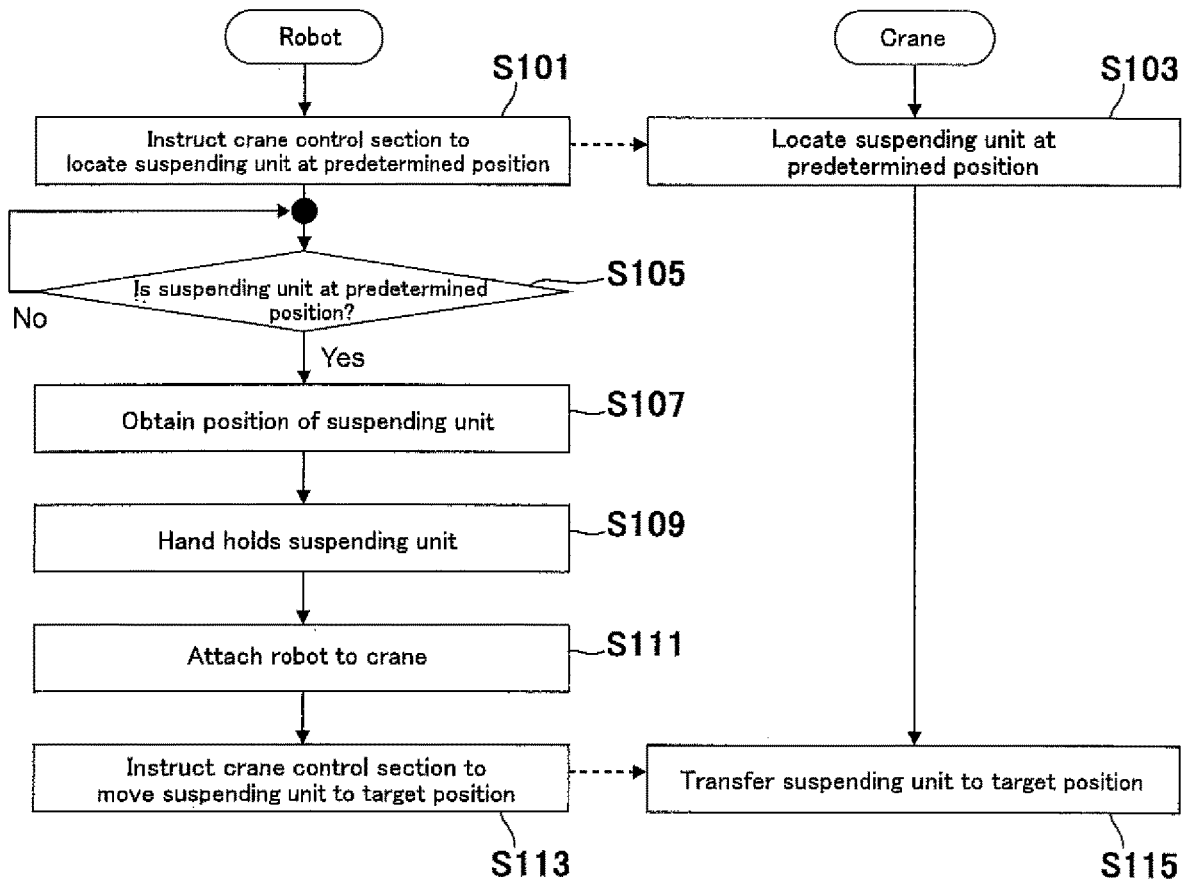
FIG. 4 is a flowchart showing the exemplary operation of the robot and crane cooperative work system, in step S1 of FIG. 3.
Figure 5:
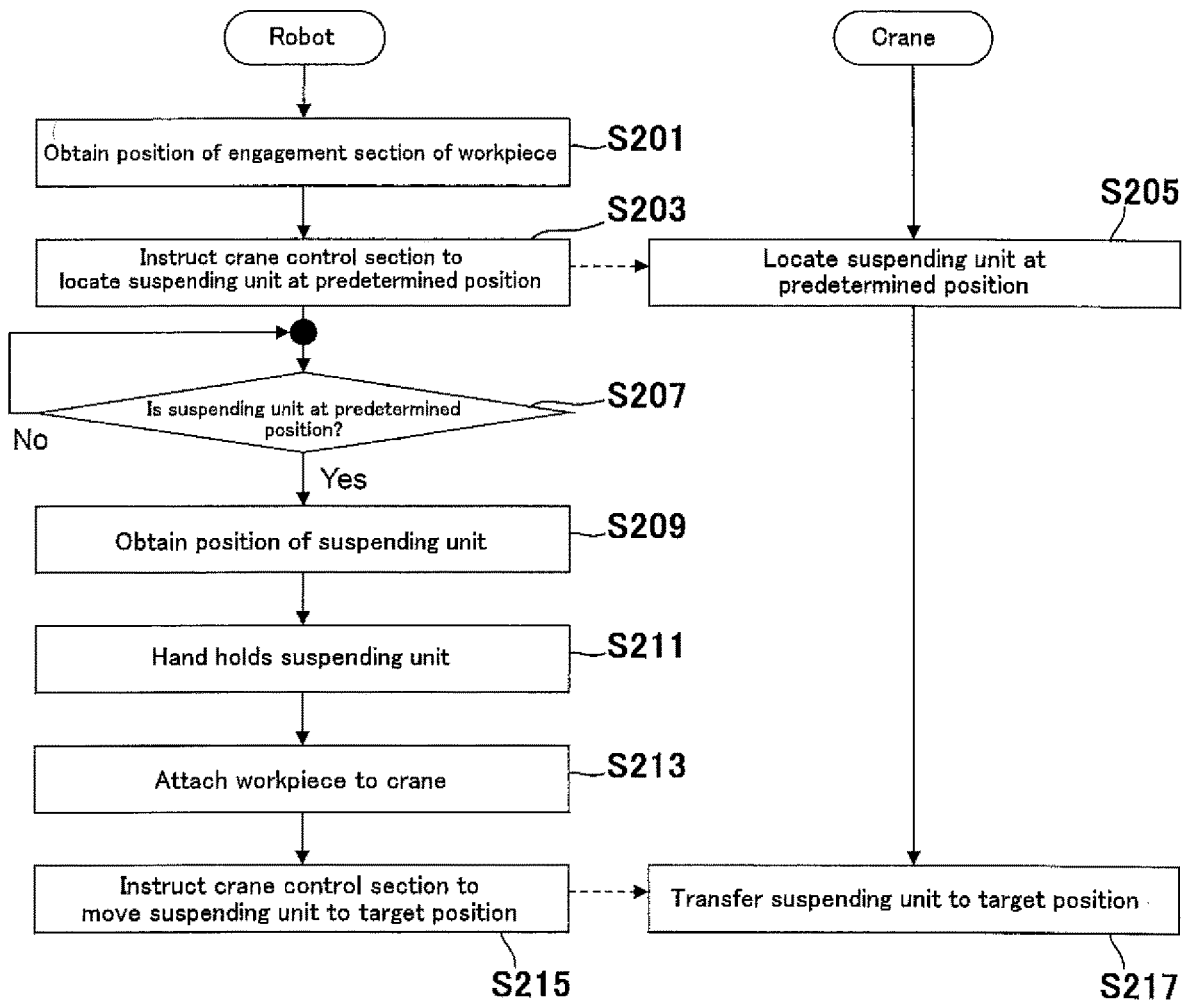
FIG. 5 is a flowchart showing the exemplary operation of the robot and crane cooperative work system, in step S3 of FIG. 3.

FIGS. 3 to 5 are flowcharts showing the exemplary operations of the cooperative work system 100. FIGS. 6A to 6E are views showing the exemplary operations of the cooperative work system 100.

Figure 6A:
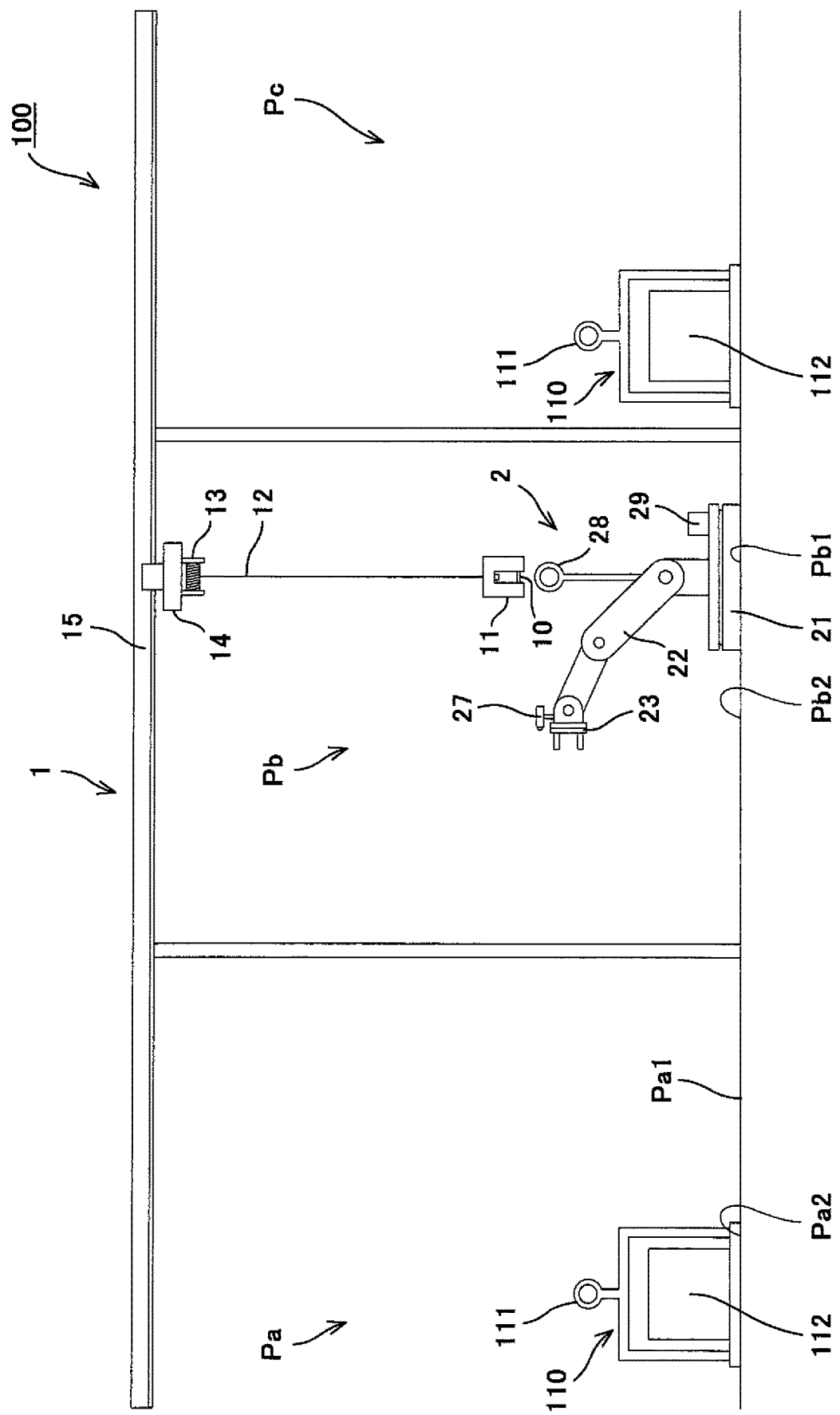
FIG. 6A is a view showing the exemplary operation of the robot and crane cooperative work system of FIG. 1.
Figure 6C:
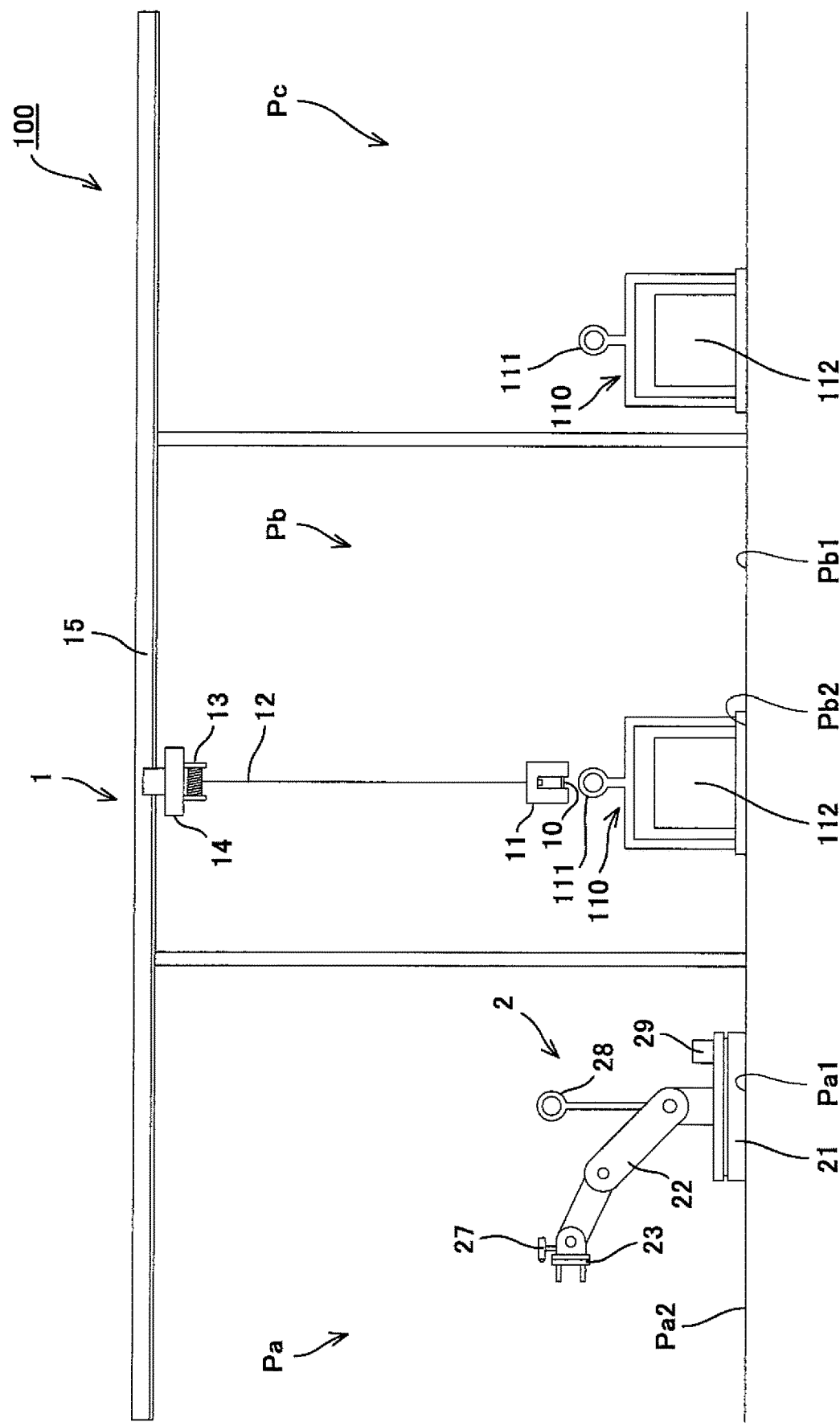
FIG. 6C is a view showing the exemplary operation of the robot and crane cooperative work system of FIG. 1.
Figure 6D:
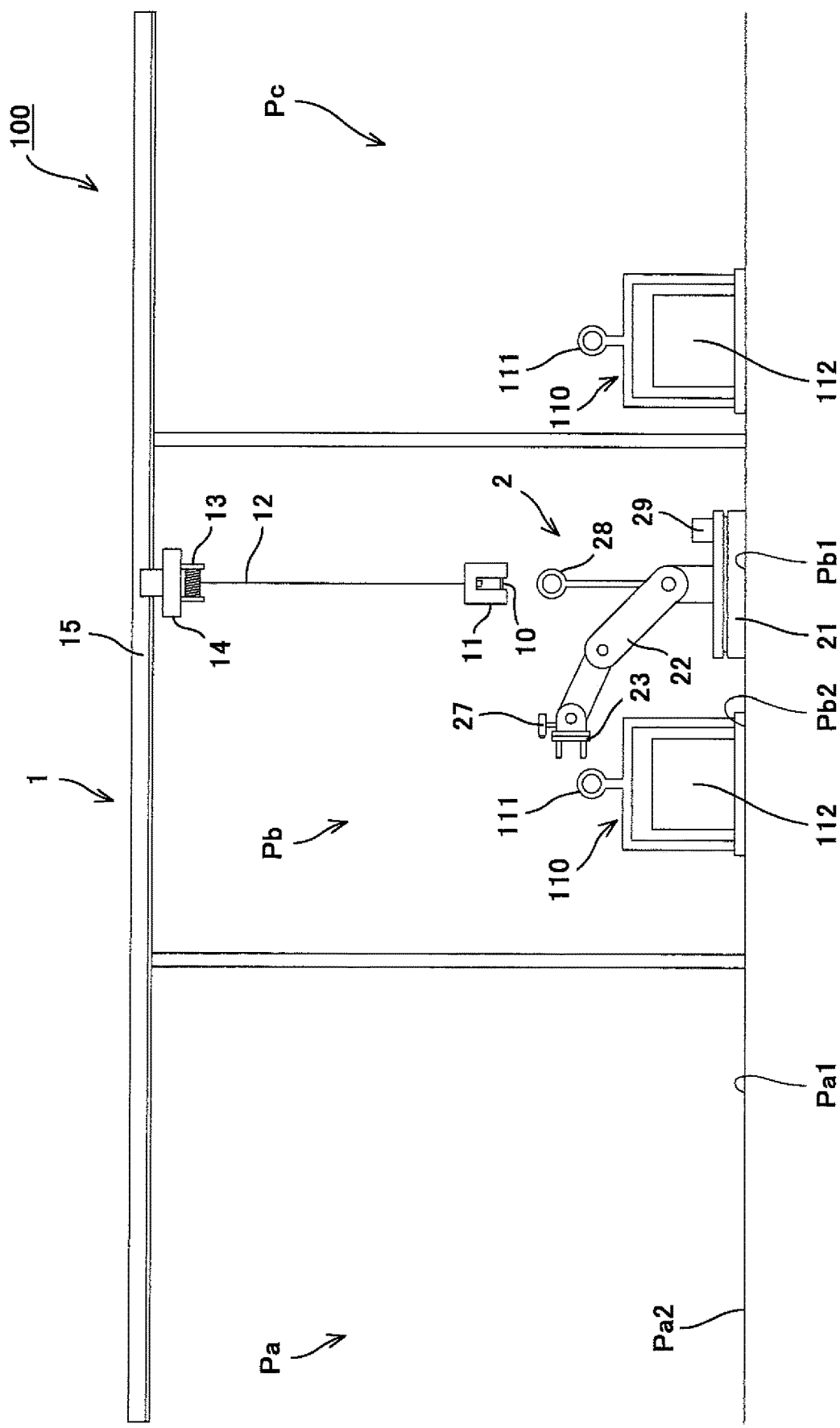
FIG. 6D is a view showing the exemplary operation of the robot and crane cooperative work system of FIG. 1.

As shown in FIG. 6A, at the initial state of the present exemplary operation, the robot 2 is located at the robot placement position Pb1 of the processing place Pb.

<Operation for Moving a Robot to an Unprocessed Workpiece Placement Place>

As shown in FIG. 3, firstly, a series operations described below, are performed, to move the robot 2 from the processing place Pb (see FIG. 6A) to the unprocessed workpiece placement place Pa where the unprocessed workpiece 110 is placed (see FIG. 6B) (step S1).

Specifically, as shown in FIG. 4, initially, the cooperation control section 65 of the robot 2 instructs the crane control section 51 to locate the suspending unit 11 at a predetermined position within the operation region of the robot 2 (e.g., a position that is above the engagement section 28 of the robot 2 located at the robot placement position Pb1) (step S101).

Then, the crane control section 51 of the crane 1 controls the movement mechanism 18 in response to the instruction provided by the robot 2 to locate the suspending unit 11 at the predetermined position within the operation region of the robot 2, corresponding to the instruction provided by the cooperation control section 65 (step S103). It should be noted that in this control, the transfer position accuracy of the suspending unit 11 may be low.

Then, the control section 60 of the robot 2 determines whether or not the suspending unit 11 is at the predetermined position within the operation region of the robot 2 (step S105). The control section 60 of the robot 2 performs this determination based on, for example, whether or not a predetermined time has passed, but this is merely exemplary. Instead of this, the control section 60 of the robot 2 may perform the determination, based on, for example, the position information of the suspending unit 11 which is transmitted from the control section 50 of the crane 1.

Then, the control section 60 of the robot 2 stands-by until the control section 60 determines that the suspending unit 11 is at the predetermined position within the operation region of the robot 2 (No in step S105). Then, when the control section 60 of the robot 2 determines that the suspending unit 11 is at the predetermined position within the operation region of the robot 2 (Yes in step S105), the robot control section 62 operates the arm 22 to cause the camera 27 to face the above-described predetermined position. Then, the camera 27 takes an image, and the suspending unit position obtaining section 63 of the robot 2 obtains the position of the suspending unit 11 based on this image (step S107). Then, the robot control section 62 drives the arm drive section 24 to move the hand 23 to the position at which the suspending unit 11 is located, and drives the hand drive section 25 to cause the hand 23 to perform the holding operation (step S109). By this holding operation, the suspending unit 11 is held by the hand 23. Therefore, even in a case where the transfer position accuracy of the suspending unit 11 located at the predetermined position, under control of the crane control section 51, is low, the suspending unit 11 can be held by the hand 23.

Then, the robot control section 62 of the robot 2 drives the arm drive section 24 to guide the suspending unit 11 of the crane 1 which is held by the hand 23, to the engagement section 28 of the robot 2, and causes the engagement section 10 of the suspending unit 11 of the crane 1 and the engagement section 28 of the robot 2 to be engaged with each other (step S111). At this time, the robot control section 62 of the robot 2 initially drives the arm drive section 24 to move the hand 23 to guide the suspending unit 11 to a position (first guide position) set at a predetermined distance that is above the engagement section 28 of the robot 2, and locate the suspending unit 11 at the first guide position. Then, the robot control section 62 of the robot 2 drives the arm drive section 24 to move the hand 23 to guide the suspending unit 11 from the first guide position to a lower position and locate the suspending unit 11 at the lower position. This allows the engagement section 10 of the suspending unit 11 and the engagement section 28 of the robot 2 to be engaged with each other. In the above-described manner, in the configuration of the cooperative work system 100, the robot 2 treats the robot 2 itself in such a manner that the robot 2 operates the hand 23 and the arm 22 to attach the robot 2 to the crane 1. Therefore, even in a case where the position accuracy of the robot 2 located at the robot placement position Pb1 is low, the robot 2 can be attached to the crane 1 without an operator.

Then, the cooperation control section 65 of the robot 2 instructs the crane control section 51 to move the suspending unit 11 to move the workpiece 110 attached to the suspending unit 11 to a target position, namely, to the robot placement position Pa1 of the unprocessed workpiece placement place Pa (step S113).

Then, the crane control section 51 of the crane 1 controls the movement mechanism 18 in response to the instruction provided by the robot 2 to move (move up, horizontally and down) the suspending unit 11 to transfer (carry) the robot 2 attached to the suspending unit 11 toward the target position (step S115). When the robot 2 is placed at the target position (robot placement position Pa1), the suspending unit 11 is automatically disengaged from the engagement section 28 of the robot 2, and thus the robot 2 is detached from the crane 1. It should be noted that in this control, the transfer position accuracy of the robot 2 may be low.

<Operation for Moving a Workpiece to a Processing Place>

Then, as shown in FIG. 3, the control section 60 of the robot 2 determines whether or not the robot 2 has been detached from the crane 1 and has been moved to the unprocessed workpiece placement place Pa (step S2). The control section 60 of the robot 2 performs this determination based on, for example, whether or not a predetermined time has passed, but this is merely exemplary. Instead of this, the control section 60 of the robot 2 may perform the determination based on, for example, information indicating that a load of the suspending unit 11 which is transmitted from the control section 50 of the crane 1 becomes zero.

Then, the control section 60 of the robot 2 stands-by until the control section 60 determines that the robot 2 has been moved to the unprocessed workpiece placement place Pa (No in step S2). Then, when the control section 60 determines that the robot 2 has been moved to the unprocessed workpiece placement place Pa (Yes in step S2), the control section 60 of the robot 2 performs a series of operations described below, to move the workpiece 110 from the unprocessed workpiece 110 (see FIG. 6B) to the processing place Pb (see FIG. 6C) (step S3).

Specifically, as shown in FIG. 5, the robot control section 62 operates the arm 22 to cause the camera 27 to face the workpiece placement position Pa2. Then, the camera 27 takes an image, and the object engagement section position obtaining section 64 of the robot 2 obtains the position of the engagement section 111 of the workpiece 110 which is a target to be processed, based on this image (step S201).

Then, the cooperation control section 65 of the robot 2 instructs the crane control section 51 to locate the suspending unit 11 at a predetermined position within the operation region of the robot 2 (e.g., a position that is above the engagement section 111 of the workpiece 110 located at the workpiece placement position Pa2) (step S203).

Then, the crane control section 51 of the crane 1 controls the movement mechanism 18 in response to the instruction provided by the robot 2 to locate the suspending unit 11 at a predetermined position within the operation region of the robot 2, corresponding to the instruction provided by the cooperation control section 65 (step S205). It should be noted that in this control, the transfer position accuracy of the suspending unit 11 may be low.

Then, the control section 60 of the robot 2 determines whether or not the suspending unit 11 is at the predetermined position within the operation region of the robot 2 (step S207).

Then, the control section 60 of the robot 2 stands-by until the control section 60 determines that the suspending unit 11 is at the predetermined position within the operation region of the robot 2 (No in step S207). Then, when the control section 60 of the robot 2 determines that the suspending unit 11 is at the predetermined position within the operation region of the robot 2 (Yes in step S207), the robot control section 62 operates the arm 22 to cause the camera 27 to face the above-described predetermined position. Then, the camera 27 takes an image, and the suspending unit position obtaining section 63 of the robot 2 obtains the position of the suspending unit 11 based on this image (step S209). Then, the robot control section 62 drives the arm drive section 24 to move the hand 23 to the position at which the suspending unit 11 is located, and drives the hand drive section 25 to cause the hand 23 to perform the holding operation (step S211). By the holding operation, the suspending unit 11 is held by the hand 23. Therefore, even in a case where the transfer position accuracy of the robot 2 located at the predetermined position and the transfer position accuracy of the suspending unit 11 located at the predetermined position, under control of the crane control section 51, are low, the suspending unit 11 can be held by the hand 23.

Then, the robot control section 62 of the robot 2 drives the arm drive section 24 to guide the suspending unit 11 of the crane 1 which is held by the hand 23 to the engagement section 111 of the workpiece 110, and causes the engagement section 10 of the suspending unit 11 of the crane 1 and the engagement section 111 of the workpiece 110 to be engaged with each other (step S213). At this time, the robot control section 62 of the robot 2 initially drives the arm drive section 24 to move the hand 23 to guide the suspending unit 11 to a position (first guide position) set at a predetermined distance that is above the engagement section 111 of the workpiece 110, and locate the suspending unit 11 at the first guide position. Then, the robot control section 62 of the robot 2 drives the arm drive section 24 to move the hand 23 to guide the suspending unit 11 from the first guide position to a lower position and locate the suspending unit 11 at the lower position. In this way, the engagement section 10 of the suspending unit 11 and the engagement section 111 of the workpiece 110 can be engaged with each other. In the above-described manner, in the configuration of the cooperative work system 100, the robot 2 treats the workpiece 110 in such a manner that the robot 2 operates the hand 23 and the arm 22 to attach the workpiece 110 to the crane 1. Therefore, even in a case where the position accuracy of the workpiece 110 located at the workpiece placement position Pa2 or the transfer position accuracy of the robot 2 located at the robot placement position Pa1 by the crane 1 is low, the workpiece 110 can be attached to the crane 1 as in a case where an operator works in a conventional method.

Then, the cooperation control section 65 of the robot 2 instructs the crane control section 51 to move the suspending unit 11 to move the workpiece 110 attached to the suspending unit 11 to a target position, namely, the workpiece processing position Pb2 of the processing place Pb (step S215).

Then, the crane control section 51 of the crane 1 controls the movement mechanism 18 in response to the instruction provided by the robot 2 to move the suspending unit 11 to transfer (carry) the workpiece 110 attached to the suspending unit 11 toward the target position (step S217). When the workpiece 110 attached to the suspending unit 11 is placed at the target position (workpiece processing position Pb2), the suspending unit 11 is automatically disengaged from the engagement section 111 of the workpiece 110, and thus the workpiece 110 is detached from the crane 1. It should be noted that in this control, the transfer position accuracy of the workpiece 110 may be low.

In the above-described manner, in the configuration of the cooperative work system 100, the crane 1 moves the workpiece 110 from the workpiece placement position Pa2 to the workpiece processing position Pb2.

<Operation for Moving a Robot to a Workpiece Processing Place>

Then, as shown in FIG. 3, the control section 60 of the robot 2 determines whether or not the workpiece 110 has been detached from the crane 1 and has been moved to the processing place Pb (step S4). The control section 60 of the robot 2 performs this determination based on, for example, whether or not a predetermined time has passed, but this is merely exemplary. Instead of this, the control section 60 of the robot 2 may perform the determination, based on, for example, information indicating that the load of the suspending unit 11 which is transmitted from the control section 50 of the crane 1 becomes zero.

Then, the control section 60 of the robot 2 stands-by until the control section 60 determines that the workpiece 110 has been moved to the processing place Pb (No in step S4). Then, when the control section 60 of the robot 2 determines that the workpiece 110 has been moved to the processing place Pb (Yes in step S4), the control section 60 performs a series of operations to move the robot 2 from the unprocessed workpiece placement place Pa (see FIG. 6C) to the processing place Pb (see FIG. 6D) (step S5).

The target position to which the robot 2 is moved in the above-described series of operations in step S1 is the robot placement position Pa1 of the unprocessed workpiece placement place Pa. In contrast, the target position to which the robot 2 is moved in the above-described series of operations in step S5 is the robot placement position Pb1 of the processing place Pb. In other respects, the series of operations in step S5 are the same as those in step S1. In the above-described manner, in the configuration of the cooperative work system 100 of the present embodiment, the crane 1 moves the robot 2 between the robot placement position Pa1 and the robot placement position Pb1.

Therefore, in the cooperative work system 100, the robot 2 can be moved to the processing place of the workpiece 110 for itself, as in a case where the operator works in a conventional method.

Thus, in the cooperative work system 100, the robot 2 treats the robot 2 itself in such a manner that the robot 2 operates the hand 23 and the arm 22 to attach the robot 2 itself to the crane 1. Therefore, even in a case where the transfer position accuracy of the robot 2 located at the robot placement position Pa1 is low, the robot 2 can be attached to the crane 1, and the operations in the production line can be carried out without the operator.

<Operation Performed by a Robot to Process a Workpiece>

Then, as shown in FIG. 3, the control section 60 of the robot 2 determines whether or not the robot 2 has been detached from the crane 1 and has been moved to the processing place Pb (step S6). The control section 60 of the robot 2 performs this determination based on, for example, whether or not a predetermined time has passed, but this is merely exemplary. Instead of this, the control section 60 of the robot 2 may perform the determination, based on, for example, information indicating that the load of the suspending unit 11 which is transmitted from the control section 50 of the crane 1 becomes zero.

Then, the control section 60 of the robot 2 stands-by until the control section 60 determines that the robot 2 has been moved to the processing place Pb (No in step S6). Then, when the control section 60 determines that the robot 2 has been moved to the processing place Pb (Yes in step S6), the robot 2 processes the workpiece 110 (step S7).

Specifically, the robot 2 drives the hand drive section 25 to cause the hand 23 to perform the mounting operation for mounting a tool which is not shown, and then process the workpiece 110 by use of the tool. When the robot 2 has completed processing of the workpiece 110, the robot 2 drives the hand drive section 25 to cause the hand 23 to perform the detaching operation for detaching the tool mounted to the hand 23.

<Operation for Moving a Workpiece to a Processed Workpiece Placement Place>

Then, as shown in FIG. 3, the control section 60 of the robot 2 performs a series of operations, to move the workpiece 110 from the processing place Pb (see FIG. 6D) to the processed workpiece placement place Pc (see FIG. 6E) (step S8).

The target position to which the workpiece 110 is moved in the above-described series of operations in step S3 is the workpiece processing position Pb2 of the processing place Pb. In contrast, the target position to which the workpiece 110 is moved in the above-described series of operations in step S8 is the processed workpiece placement place Pc. In other respects, the series of operations in step S8 are the same as those in step S3. Thus, in the configuration of the cooperative work system 100, the robot 2 treats the workpiece 110 in such a manner that the robot 2 operates the hand 23 and the arm 22 to attach the workpiece 110 to the crane 1. Therefore, even in a case where the transfer position accuracy of the workpiece 110 transferred (carried) to the workpiece processing position Pb2 by the crane 1 or the transfer position accuracy of the robot 2 transferred to the robot placement position Pb1 by the crane 1 is low, the workpiece 110 can be attached to the crane 1.

As described above, in the present embodiment, the cooperative work system 100 can transfer the workpiece 110 located at the unprocessed workpiece placement place Pa to the processing place Pb, process the workpiece 110 in the processing place Pb, and transfer the processed workpiece 110 to the processed workpiece placement place Pc. Thus, the series of operations in the production line can be performed without an operator.

The robot 2 is configured to engage the engagement section 10 of the suspending unit 11 of the crane 1 and the engagement section 111 of the workpiece 110 with each other, and engage the engagement section 28 of the robot 2 itself and the engagement section 10 of the suspending unit 11 of the crane 1 with each other. Therefore, even in a case where the transfer position accuracy of the suspending unit 11 of the crane 1 is low or a case where the transfer position accuracy of the workpiece 110 or the robot 2 which is transferred (carried) by the crane 1 is low, the workpiece 110 or the robot 2 can be attached to the crane 1, and the above-described series of operations can be carried out. In addition, the configuration for attaching the workpiece 110 or the robot 2 to the crane 1 can be simplified. As a result, the cooperative work system 100 can be constructed in an inexpensive manner.

Further, since the robot 2 is moved between the unprocessed workpiece placement place Pa and the processing place Pb and engages the engagement section 10 of the suspending unit 11 of the crane 1 and the engagement section 111 of the workpiece 110 with each other, the number of robots included in the cooperative work system 100 can be reduced. As a result, the cooperative work system 100 can be constructed in an inexpensive manner.

The robot 2 and the workpiece 110 are transferred (carried) by the crane 1. Therefore, unlike in a case where the robot 2 moves for itself without being transferred by other means between the unprocessed workpiece placement place Pa and the processing place Pb, or a case where the workpiece 110 is conveyed by a conveyor, it is not necessary to provide a path through which the robot 2 moves or a path through which the workpiece 110 is conveyed, a space in which the system is installed is not increased, and a floor area required to transfer the workpiece 110 is not increased.

As described above, in the cooperative work system 100 of the present invention, the robot 2 and the crane 1 can work (operate) cooperatively, to move the workpiece 110 among the unprocessed workpiece placement place Pa, the processing place Pb, and the processed workpiece placement place Pc, which are located to be distant from each other, and the robot 2 can process the workpiece 110 in the processing space Pb. In this way, the workpiece 110 can be transferred (carried) and processed by use of the robot 2, as in a case where the operator works in the conventional method.

In summary, the present invention can solve a problem that the number of operators who work in the production line is reduced, or the operations in the production line can be carried out without the operator, by use of a new method in which the robot 2 attaches the workpiece 110 to the crane 1 to transfer the workpiece 110 as in a case where the operator works in the conventional method, the robot 2 is moved among the unprocessed workpiece placement place Pa, the processing place Pb, and the processed workpiece placement place Pc, which are located to be distant from each other, as in a case where the operator moves among the unprocessed workpiece placement place Pa, the processing place Pb, and the processed workpiece placement place Pc, in the conventional method, and thus the robot performs the whole of the operator's work in the production line, without providing special equipment or device for automation, such as an automatic conveyor transfer device.

Since the robot 2 and the workpiece 110 are transferred (carried) by the crane 1, it becomes possible to prevent an increase in the floor area required to transfer the workpiece 110.

Further, since the robot 2 is configured to instruct the crane 1 to operate (perform the operation), the operations in the production line in which the workpiece is transferred and processed can be carried out without the operator.

As a result, the workpiece 110 can be transferred and processed by use of the robot 2, and the floor area required to transfer the workpiece 110 is not increased.

Embodiment 2

In Embodiment 1 and 2, the cooperative work system 100 includes the crane 1 which is a single crane. Alternatively, a cooperative work system may include a plurality of cranes.

In this configuration, transferring the workpiece 110 from the unprocessed workpiece placement place Pa to the processing place Pb in step S3 and transferring the robot 2 from the unprocessed workpiece placement place Pa to the processing place Pb in step S5 may be performed concurrently, by use of the plurality of cranes.

This makes it possible to reduce a cycle time required for the series of operations performed for the workpiece.

Further, before a certain crane transfers the workpiece 110 and puts it down onto the target position in the processing place Pb or the target position in the processed workpiece placement place Pc, another crane may transfer the robot 2 to the processing place Pb or the processed workpiece placement place Pc. Then, the robot control section 62 of the robot 2 operates the arm 22 and the hand 23 to hold the workpiece 110 to be put down onto the processing place Pb or the processed workpiece placement place Pc so that the posture and positioning of the workpiece 110 to be placed at the target position can be determined.

Embodiment 3

In Embodiment 1, when the workpiece 110 or the robot 2 is placed at the target position, the suspending unit 11 is automatically disengaged from the engagement section 111 of the workpiece 110 or the engagement section 28 of the robot 2, and thus the workpiece 110 or the robot 2 is automatically detached from the crane 1. In an alternative configuration, when the workpiece 110 or the robot 2 is placed at the target position, the robot 2 may detach the workpiece 110 or the robot 2 itself which is suspended by the crane 1 in such a manner that the robot 2 operates the hand 23 and the arm 22 to detach the suspending unit 11 from the engagement section 111 of the workpiece 110 or the engagement section 28 of the robot 2

Embodiment 4

Figure 7:
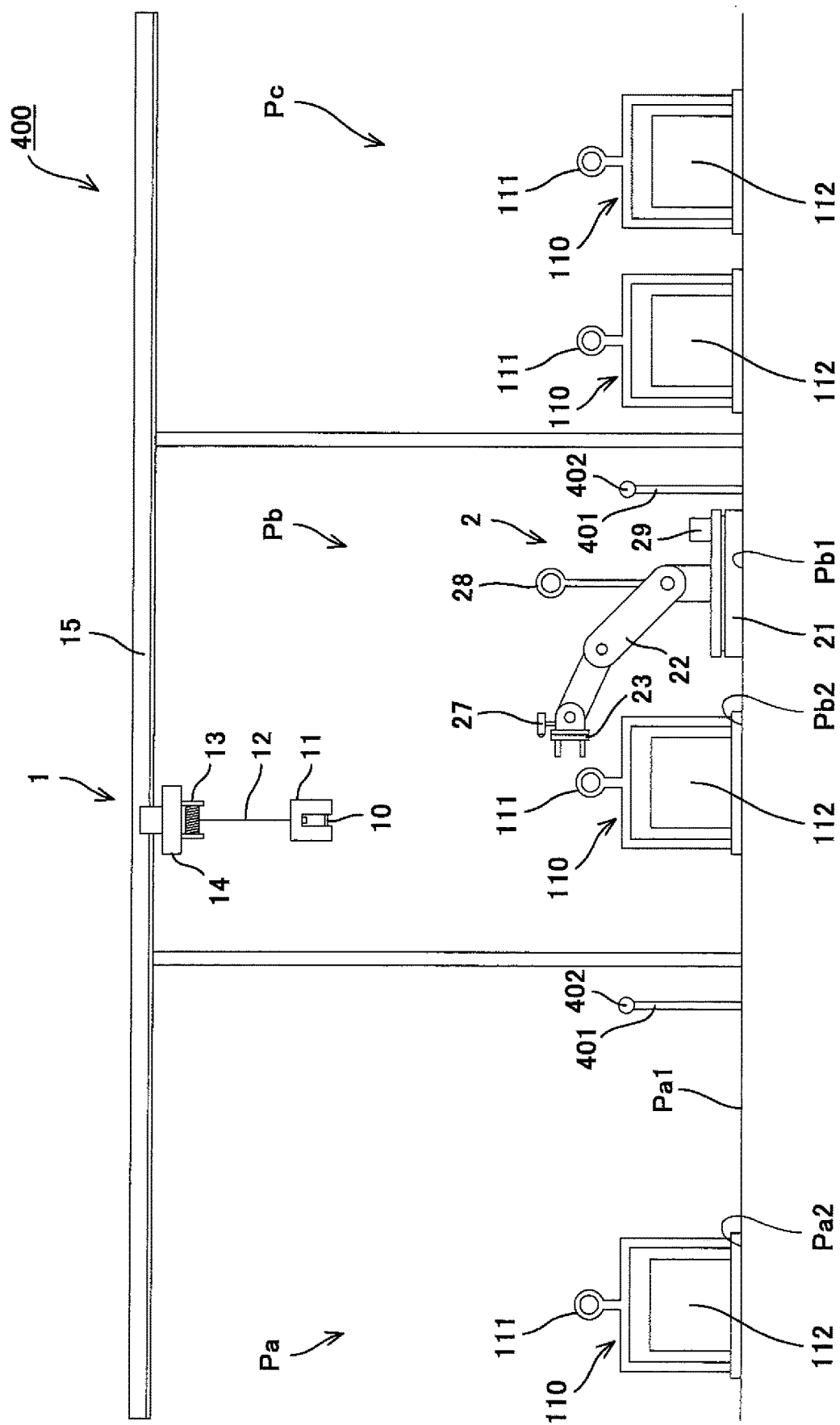
FIG. 7 is a view showing the exemplary configuration of a robot and crane cooperative work system according to Embodiment 4 of the present invention.
Figure 8:
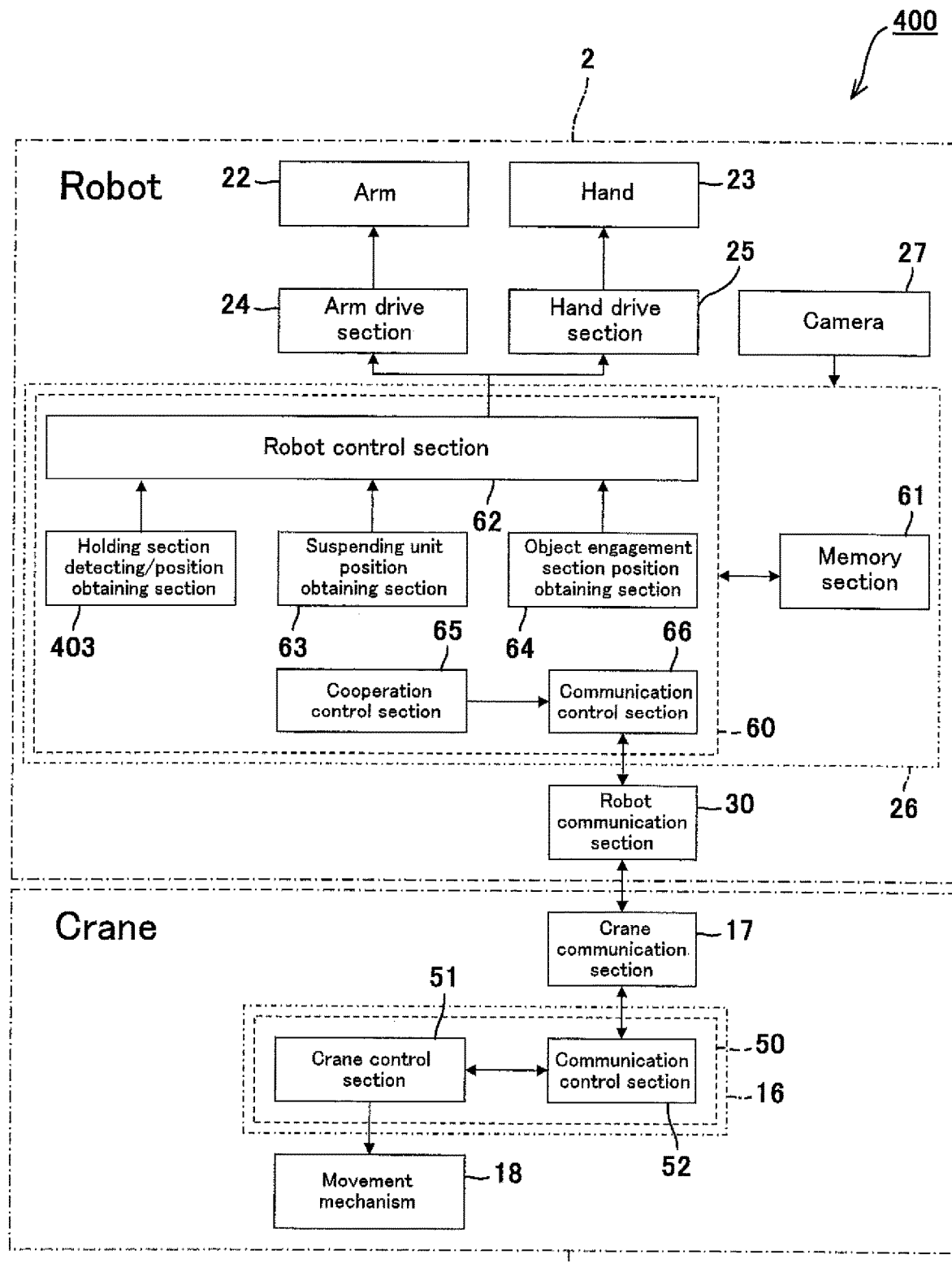
FIG. 8 is a block diagram schematically showing the exemplary configuration of a control system of the robot and crane cooperative work system of FIG. 6.

FIG. 7 is a view showing the exemplary configuration of a cooperative work system 400 according to Embodiment 4. FIG. 8 is a block diagram schematically showing the exemplary configuration of a control system of the cooperative work system 400.

As shown in FIG. 7, the cooperative work system 400 of Embodiment 4 further includes a swing preventing member 401 provided on each of the unprocessed workpiece placement place Pa and the processing place Pb, in addition to the above-described constituents of Embodiment 1.

The swing preventing member 401 is a columnar member provided on each of the robot placement position Pa1 and the processing place Pb, or a location which is adjacent to the robot placement position Pa1 or the processing place Pb in such a manner that the swing preventing member 401 extends vertically upward. The swing preventing member 401 is an elastic body, and is made of, for example, rubber. The swing preventing member 401 includes a holding section 402 in a top portion thereof, which is to be held by the hand 23 of the robot 2.

Further, the cooperative work system 400 according to Embodiment 4 is configured in such a manner that the control section 60 of the robot 2 includes a holding section detecting/position obtaining section 403. The holding section detecting/position obtaining section 403 processes an image taken by the camera 27, to detect the holding section 402 and obtain the position of the holding section 402.

Exemplary Operation

Next, the exemplary operation of the robot 2 according to Embodiment 6 will be described.

In some cases, the robot 2 suspended by the crane 1 swings, just before the robot 2 is positioned. In the present embodiment, the robot 2 is caused to hold the swing preventing member 401 so that the robot 2 ceases to swing. In order to hold the swing preventing member 401, it is necessary to obtain the position of the swing preventing member 401 during the positioning operation of the robot 2.

In the present exemplary operation, in a state in which the robot 2 is transferred by the crane 1 to be moved from the processing place Pb to the unprocessed workpiece placement place Pa or from the unprocessed workpiece placement place Pa to the processing place Pb, the robot control section 62 operates the arm 22 to cause the camera 27 to face the swing preventing member 401 which is a target position to which the robot 2 should be moved. Then, the camera 27 successively takes the images of the target position, and based on the taken images, the robot control section 62 determines whether or not the holding section detecting/position obtaining section 403 has detected the holding section 402. Then, when the robot control section 62 determines that the holding section detecting/position obtaining section 403 has detected the holding section 402, the holding section detecting/position obtaining section 403 obtains real time position of the holding section 402. Then, the robot control section 62 determines whether or not the holding section 402 is located within the operation region of the robot 2. Then, when the robot control section 62 determines that the holding section 402 is located within the operation region of the robot 2, the robot control section 62 drives the arm drive section 24 to move the hand 23 to the position at which the holding section 402 is located, and drives the hand drive section 25 to cause the hand 23 to perform the holding operation. The hand 23 holds the holding section 402. If the robot 2 is swinging at a time point when the hand 23 is holding the holding section 402, the swing preventing member 401 is deflected to absorb the swing of the robot 2 suspended by the crane 1. In this way, the swing of the robot 2 suspended by the crane 1 can quickly converge, and the robot 2 can be quickly located at the robot placement position Pa1 or the robot placement position Ni1 with a high accuracy.

Embodiment 5

Figure 9:
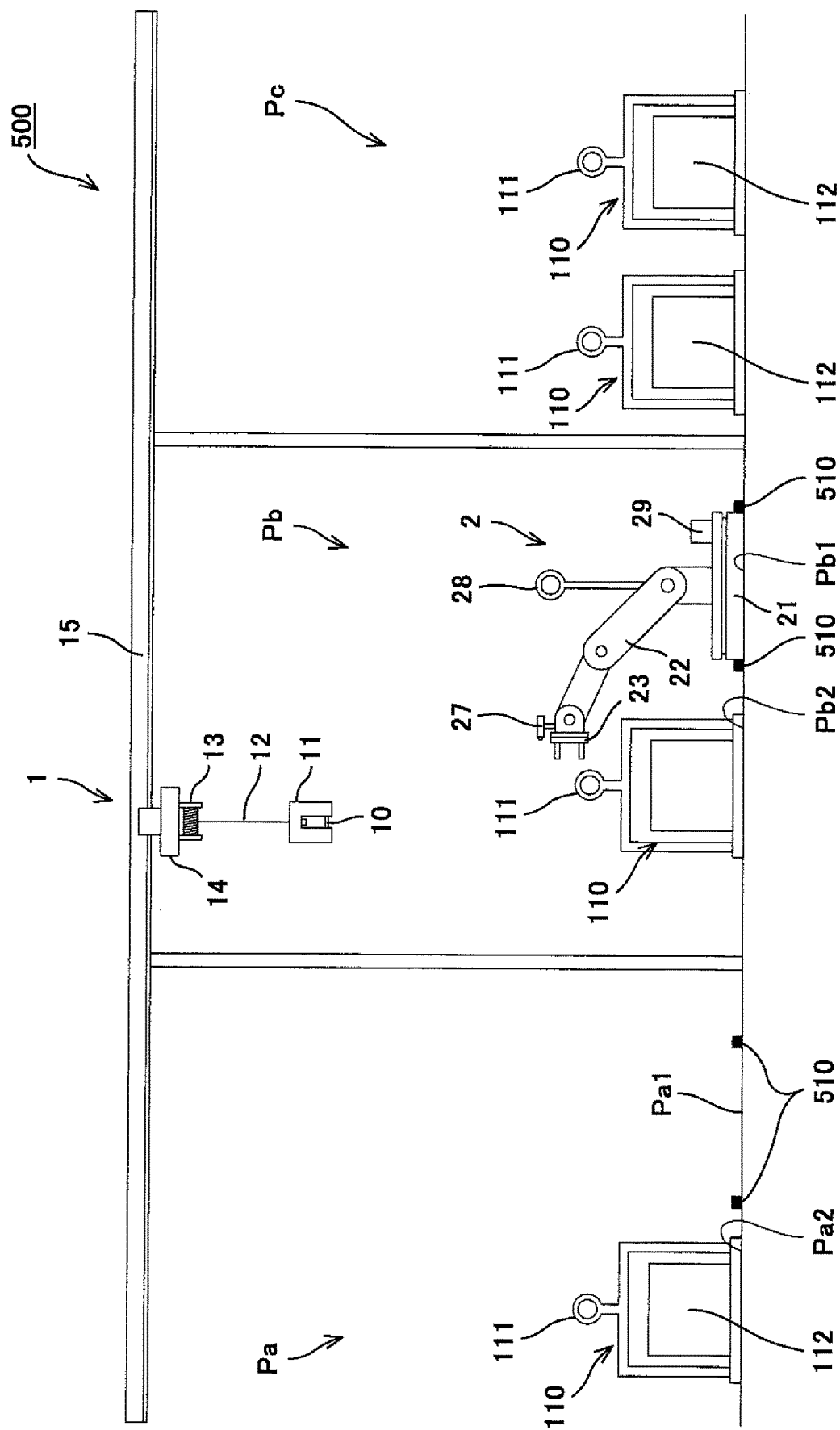
FIG. 9 is a view showing the exemplary configuration of a robot and crane cooperative work system according to Embodiment 5 of the present invention.
Figure 10:
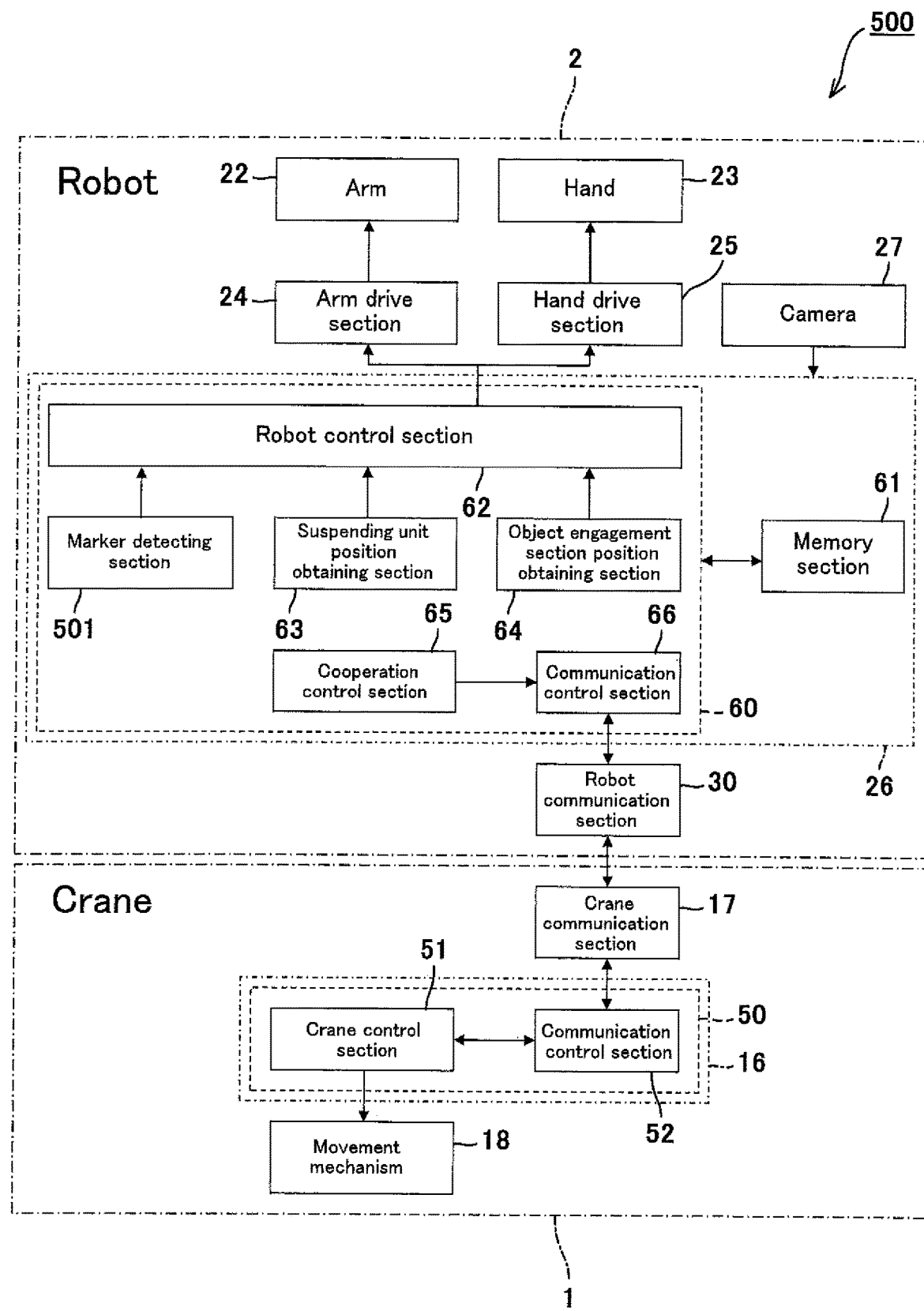
FIG. 10 is a block diagram schematically showing the exemplary configuration of a control system of the robot and crane cooperative work system of FIG. 8.

FIG. 9 is a view showing the exemplary configuration of a cooperative work system 500 according to Embodiment 5. FIG. 10 is a block diagram schematically showing the exemplary configuration of a control system of the cooperative work system 500.

The cooperative work system 500 according to Embodiment 5 includes markers 510 attached to spots which are in the vicinity of the robot placement position Pa1 and the robot placement position Pb1, in addition to the constituents of the above-described Embodiment 1. The markers 510 refer to, for example, patterns which are drawn on the floor surface and can be distinguished from other parts.

The control section 60 of the robot 2 in the cooperative work system 500 according to Embodiment 5 is configured to include a marker detecting section 501. The marker detecting section 501 processes the images taken by the camera 27 to detect the markers 510 at the robot placement position Pa1 or the robot placement position Pb1. Then, the cooperation control section 65 of the robot 2 instructs the crane control section 51 of the crane 1 to locate the robot 2 at the robot placement position Pa1 or the robot placement position Pb1, based on a relative positional relationship between the markers 510 detected by the marker detecting section 501, and the robot 2.

In the above-described manner, the robot 2 can be located at the robot placement position Pa1 or the robot placement position Pb1, with a high accuracy.

Embodiment 6

Figure 11:
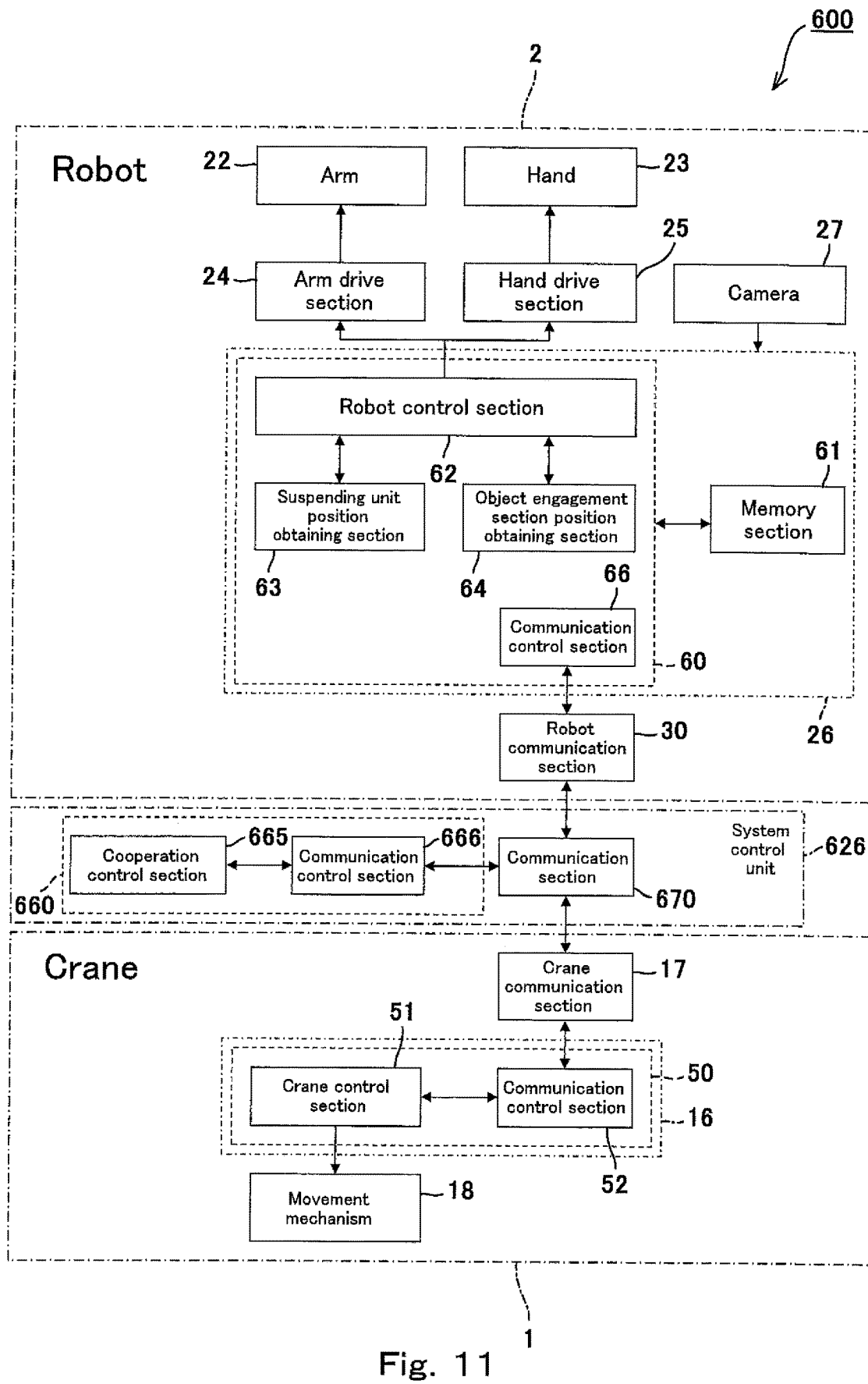
FIG. 11 is a view showing the exemplary configuration of a robot and crane cooperative work system according to Embodiment 6 of the present invention.

FIG. 11 is a block diagram schematically showing the exemplary configuration of a control system of a cooperative work system 600 according to Embodiment 6.

In the cooperative work system 100 according to the above-described Embodiment 1, the cooperation control section 65 which instructs the crane control section 51 to operate the crane 1 is included in the control section 60 of the control unit 26 of the robot 2. In contrast, in the present embodiment, the cooperative work system 600 is configured in such a manner that a system control unit 626 which is separate from the crane 1 and the robot 2 instructs the crane 1 and the robot 2 to operate (perform operations). Specifically, the system control unit 626 includes a system control section 660 including a cooperation control section 665 and a communication control section 666, and a communication section 670.

The cooperation control section 665 instructs the robot control section 62 to operate the robot, via the communication control section 666, the communication section 670, the robot communication section 30, and the communication control section 66. In addition, the cooperation control section 665 instructs the crane control section 51 to operate the crane, via the communication control section 666, the communication section 670, the crane communication section 17, and the communication control section 52.

The communication control section 666 controls the communication section 670.

The communication section 670 performs, for example, a wireless communication with the robot communication section 30, the crane communication section 17, and others, under control of the communication control section 666.

As described above, the cooperative work system 600 of the present embodiment is configured in such a manner that the system control section 660 instructs the crane 1 and the robot 2.

Embodiment 7

Figure 12:
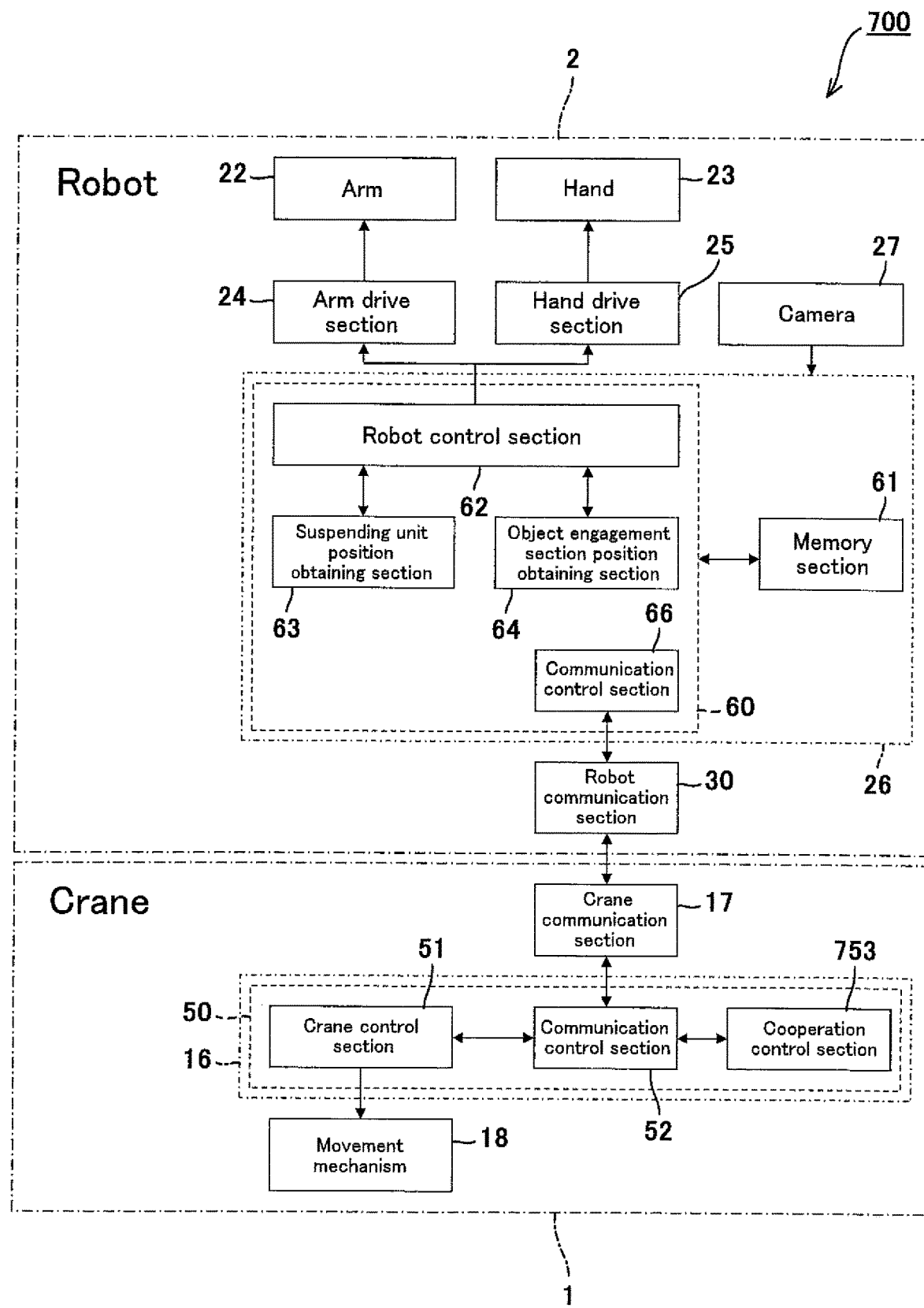
FIG. 12 is a view showing the exemplary configuration of a robot and crane cooperative work system according to Embodiment 7 of the present invention.

FIG. 12 is a block diagram schematically showing the exemplary configuration of a control system of a cooperative work system 700 according to Embodiment 7.

In the cooperative work system 100 according to the above-described Embodiment 1, the cooperation control section 65 which instructs the crane control section 51 to operate the crane 1 is included in the control section 60 of the control unit 26 of the robot 2. In contrast, in the present embodiment, the cooperative work system 700 is configured in such a manner that the control section 50 of the crane 1 instructs the robot 2 to operate (perform an operation). Specifically, the control section 50 of the crane 1 further includes a cooperation control section 753.

The cooperation control section 753 instructs the robot control section 62 to operate the robot, via the communication control section 52, the crane communication section 17, the robot communication section 30, and the communication control section 66.

As described above, the cooperative work system 700 is configured in such a manner that the crane 1 instructs the robot 2 to operate (perform the operation).

Embodiment 8

In Embodiment 1, the control section 60 of the robot 2 may be configured to instruct the crane control section 51 of the crane 1 to attach the robot 2 to the crane 1 and transfer (carry) the robot 2 to a spot that is near a battery charger (not shown) which charges the battery 29, when the control section 60 of the robot 2 determines that the SOC (state of charge) of the battery 29 becomes less than a predetermined value. Then, when the control section 60 of the robot 2 determines that the robot 2 is located near the battery charger, the robot control section 62 of the robot 2 operates, for example, the arm 22 and the hand 23, to connect the robot 2 and the battery charger to each other so that the electric power can be supplied to the battery 29. This makes it possible to prevent a situation in which the battery 29 of the robot 2 runs down.

Embodiment 9

In Embodiment 1, the robot 2 includes the camera 27, and the suspending unit position obtaining section 63 of the robot 2 processes the image taken by the camera 27 to obtain the position of the suspending unit 11 of the crane 1, and the object engagement section position obtaining section 64 of the robot 2 processes the image taken by the camera 27 to obtain the position of the engagement section 111 of the workpiece 110. In contrast, in the present embodiment, the robot 2 does not include the camera 27. The suspending unit position obtaining section 63 of the robot 2 obtains the position of the suspending unit 11 of the crane 1, based on the position information of the suspending unit 11 which is transmitted from the crane 1 to the robot 2. The object engagement section position obtaining section 64 obtains the position of the engagement section 111 of the workpiece 110 based on the placement position of the workpiece 110 which is transmitted from the crane 1 to the robot 2.

Modified Example

In the above-described Embodiment 4, the robot 2 is configured to hold the holding section 402, and thus the swing of the robot 2 converges. Alternatively, the robot 2 including an acceleration sensor may move the arm 22 to cancel the swing so that the swing of the robot 2 converges. Further, an electric magnet may be provided on the floor surface, and another electric magnet may be provided on the robot base section 21 of the robot 2 so that the swing of the robot 2 converges by attractive forces generated by these electric magnets, when the robot 2 is placed on the floor surface.

In a case where there is no response within a specified time, in step S105, step S2, step S207, step S4, and step S6 of the above-described Embodiment 1, the control section 60 of the robot 2 may instruct the crane 1 to locate the corresponding target object again.

Numerous improvements and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The invention of the present application is applicable to a production line.

REFERENCE SIGNS LIST

Pa unprocessed workpiece placement place
Pa1 robot placement position

Pa2 workpiece placement position
Pb processing place
Pb1 robot placement position
Pb2 workpiece processing position
Pc processed workpiece placement place
1 crane
2 robot
10 engagement section
11 suspending unit
12 wire rope
13 winch
14 trolley
15 traveling rail
16 control unit
17 crane communication section
18 movement mechanism
21 robot base section
22 arm
23 hand
24 arm drive section
25 hand drive section
26 control unit
27 camera
28 engagement section
29 battery
30 robot communication section
50 control section
51 crane control section
52 communication control section
60 control section
61 memory section
62 robot control section
63 suspending unit position obtaining section
64 object engagement section position obtaining section
65 cooperation control section
66 communication control section
100 cooperative work system
110 workpiece
111 engagement section
112 workpiece body

The invention claimed is:

1. A robot and crane cooperative work system for use with a workpiece including an engagement section and a tool, the robot and crane cooperative work system comprising:

a robot including an engagement section, a hand, an arm, a camera mounted to the hand or the arm, and a robot controller circuit configured to control an operation of the arm and an operation of the hand, the hand and the arm of the robot being configured to manipulate the workpiece and attach to the tool; and a crane including: a suspending unit which is engageable with the engagement sections of the workpiece and the robot; a movement mechanism which moves up and down the suspending unit and moves the suspending unit horizontally; and a crane controller circuit which is provided separately from the robot controller circuit and controls an operation of the movement mechanism, the crane being configured to: (i) move the workpiece while the workpiece is suspended, and (ii) move the robot while the robot is suspended, wherein:

the engagement section of the robot is engageable with the crane and is configured to bear a load of the robot suspended by the crane, the robot controller circuit is configured to:
control the operation of the arm and the operation of the hand;
process an image taken by the camera to obtain the position of the engagement section of the workpiece;
obtain positions of the engagement sections of the workpiece and the robot;
obtain an actual position of the suspending unit of the crane bar processing the image taken by the camera;
move the hand to the obtained actual position, at which the suspending unit is located, and cause the hand to hold the suspending unit;
move the hand to guide the suspending unit held by the hand to a position set based on the obtained position of the engagement section of the workpiece, and attach the suspending unit to the engagement section of the workpiece; and
move the hand to guide the suspending unit held by the hand to a position set based on the obtained position of the engagement section of the robot, and attach the suspending unit to the engagement section of the robot, and the robot is configured to process the workpiece using the tool.

2. The robot and crane cooperative work system according to claim 1, further comprising:
a system controller circuit,
wherein the crane and the robot are configured to allow the system controller circuit to instruct the crane and the robot to perform operations, respectively, and
wherein the system controller circuit instructs the crane and the robot to perform the operations, respectively.

3. The robot and crane cooperative work system according to claim 1, wherein the crane and the robot are configured to allow the robot to instruct the crane to perform an operation of moving the suspending unit, and
wherein the robot instructs the crane to perform the operation of moving the suspending unit.

4. The robot and crane cooperative work system according to claim 1,
wherein the crane and the robot are configured to allow the crane to instruct the robot to perform the operation of the arm and the operation of the hand, and
wherein the crane instructs the robot to perform the operation of the arm and the operation of the hand.

5. The robot and crane cooperative work system according to claim 1, wherein the robot is configured to treat the workpiece and the robot in such a manner that the robot operates the hand and the arm to attach the workpiece and the robot to the crane.

6. The robot and crane cooperative work system according to claim 1, wherein the robot is configured to treat the workpiece and the robot in such a manner that the robot operates the hand and the arm to detach the workpiece and the robot suspended by the crane from the crane.

7. The robot and crane cooperative work system according to claim 1, wherein the robot causes the hand to hold the suspending unit, and detaches the held suspending unit from the engagement section of the workpiece and the engagement section of the robot.

8. The robot and crane cooperative work system according to claim 7,
wherein the robot includes:
a robot base section placed on a placement surface;
the arm having a base end portion coupled to the robot base section;
the hand mounted to a tip end portion of the arm.

* * * * *